United States Patent
Wilkens et al.

(10) Patent No.: US 12,054,893 B2
(45) Date of Patent: Aug. 6, 2024

(54) GROOVE MONITORING SYSTEM FOR ROADWAY MARKINGS

(71) Applicant: EPIC Solutions, Inc., Fargo, ND (US)

(72) Inventors: Jeffrey Arnold Wilkens, West Fargo, ND (US); William Ricker, Williston, VT (US)

(73) Assignee: Epic Solutions, Inc., Fargo, ND (US)

( * ) Notice: Subject to any disclaimer, the term of this patent is extended or adjusted under 35 U.S.C. 154(b) by 487 days.

(21) Appl. No.: 17/229,349

(22) Filed: Apr. 13, 2021

(65) Prior Publication Data

US 2022/0098804 A1    Mar. 31, 2022

Related U.S. Application Data

(60) Provisional application No. 63/085,001, filed on Sep. 29, 2020.

(51) Int. Cl.
| | | |
|---|---|---|
| *E01C 23/09* | (2006.01) | |
| *E01C 23/18* | (2006.01) | |
| *E01C 23/01* | (2006.01) | |
| *E01F 9/512* | (2016.01) | |
| *G01B 21/20* | (2006.01) | |

(52) U.S. Cl.
CPC ...... *E01C 23/0993* (2013.01); *E01C 23/0946* (2013.01); *E01C 23/185* (2013.01); *E01C 23/01* (2013.01); *E01F 9/512* (2016.02); *G01B 21/20* (2013.01)

(58) Field of Classification Search
CPC ........ E01C 23/01; E01C 23/088; E01C 23/09; E01C 23/0933; E01C 23/0993; E01C 23/127; E01C 23/16; E01C 23/185; E01C 23/0946; E01F 9/512; G01B 21/20
USPC .................................................. 404/84.05, 94
See application file for complete search history.

(56) References Cited

U.S. PATENT DOCUMENTS

| | | | |
|---|---|---|---|
| 4,473,319 A * | 9/1984 | Spangler ............ | B60G 17/0165 73/146 |
| 8,880,362 B2 | 11/2014 | Wilkens | |
| 9,121,148 B2 | 9/2015 | Johnson | |
| 9,726,168 B2 | 8/2017 | Wilkens | |
| 10,208,746 B2 | 2/2019 | Wilkens | |
| 10,865,530 B2 | 12/2020 | Wilkens | |
| 10,876,261 B2 | 12/2020 | Wilkens | |
| 2013/0128279 A1* | 5/2013 | Wachsmann ............ | E01C 23/01 356/601 |
| 2014/0097665 A1* | 4/2014 | Paulsen .................. | E01C 23/088 356/601 |

(Continued)

*Primary Examiner* — Nicole Coy
*Assistant Examiner* — Michael A Goodwin
(74) *Attorney, Agent, or Firm* — Russell Manning; FisherBroyles, LLP

(57) ABSTRACT

Systems and method for applying roadway marking materials into a groove(s) in a roadway surface and/or forming a recessed groove(s) in a roadway surface. The systems and methods incorporate a contour sensor that provides real-time information of the marking material and/or groove. Based on the contour information, a marking material applicator can be aligned with a recessed groove in a roadway surface to ensure the marking material is applied within the confines of the groove. Alternatively, such contour information may be acquired during groove formation to ensure depth, tilt and/or bottom surface smoothness of the groove is within predetermined limits.

9 Claims, 17 Drawing Sheets

(56) References Cited

U.S. PATENT DOCUMENTS

| | | | |
|---|---|---|---|
| 2015/0132059 A1* | 5/2015 | Johnson | E01C 11/24 |
| | | | 404/94 |
| 2017/0022674 A1* | 1/2017 | Stark | E01C 23/0946 |
| 2020/0095738 A1* | 3/2020 | Sturos | E01C 23/088 |
| 2021/0148067 A1* | 5/2021 | Wagner | E01C 23/088 |

* cited by examiner

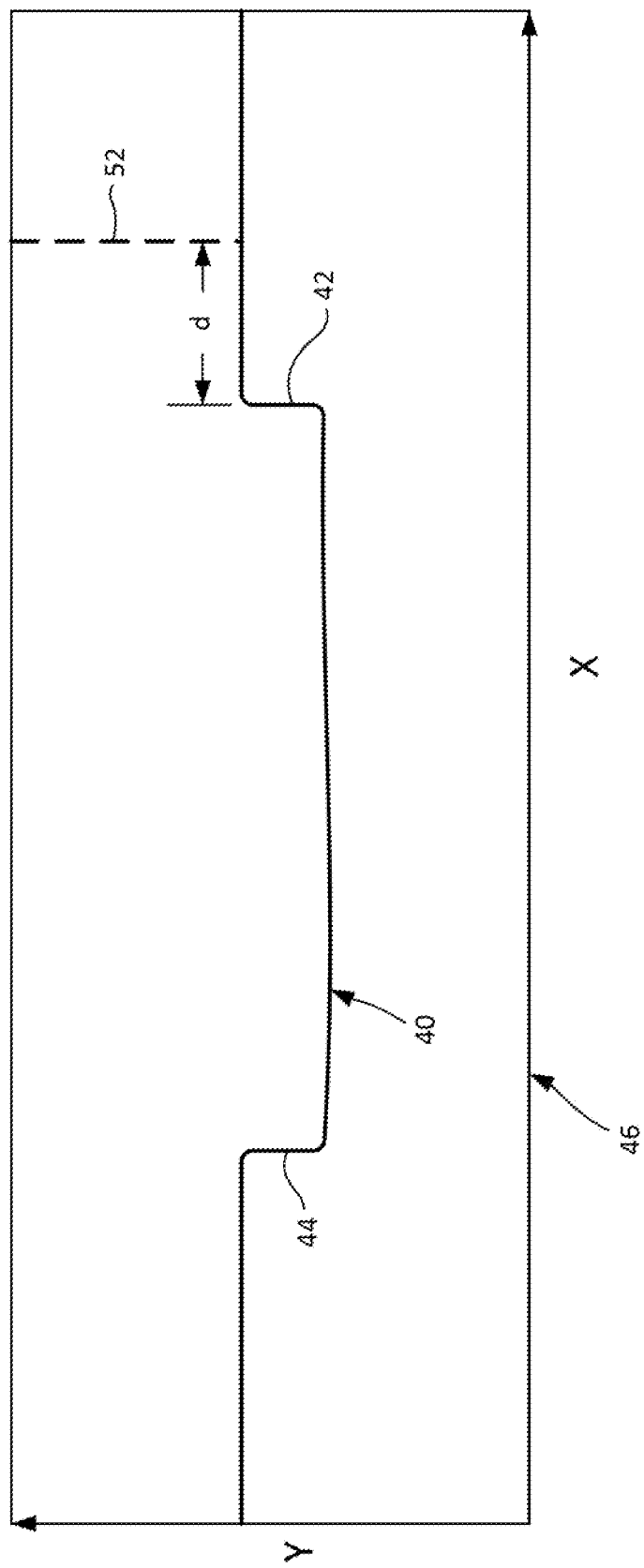

GROOVE MONITORING SYSTEM FOR ROADWAY MARKINGS

CROSS REFERENCE

The present application claims the benefit of U.S. Provisional Application No. 63/085,001 having a filing date of Sep. 29, 2020, the entire contents of which is incorporated herein by reference.

FIELD

The present disclosure relates to applying roadway markings such as thermoplastic, epoxy paint and marking tape. More particularly, the disclosure relates to systems for monitoring and controlling the formation of a groove in a roadway surface and for applying a roadway markings such that the marking material is disposed within the groove.

BACKGROUND

Roadways, crosswalks, parking lots, airports and other types of roadway surfaces often include various markings (e.g., lines, intermittent stripes, labels, words, etc.) to guide vehicle traffic, pedestrians, etc. Roadway marking materials (e.g., paints, tapes, thermoplastics, etc.) are frequently used to create visible stripes or lines. Due to the extended lengths of certain roadway markings, such as a highway centerline, applying paint is typically the most cost-effective way to mark roadway surfaces. However, in some applications, it is desirable to apply more durable materials to a roadway surface. Such durable materials include thermoplastic, epoxy paints and premade roadway marking tapes (e.g., reflective tapes). Though typically more expensive, such durable marking materials may be desirable in locations of heavy use and/or where improved reflective qualities are desired.

Thermoplastic marking materials are typically melted prior to application to, for example, a road surface. Thermoplastic road marking material, also called hot melt marking paint, begins in a solid form. A hot melt kettle is used to heat the solid feedstock to ~200° C. (~400° F.), after which the 'melt' is sprayed on the road surface. For thermoplastic paints, "spray," "extrusion," and "ribbon gun" systems may be used for paint application. Once the thermoplastic is a liquid material (i.e., melt), the thermoplastic melt is ready for application to a surface. In a spray system, the thermoplastic melt is pumped using a high pressure pump, which pushes the material through a small opening/orifice at the paint gun. This creates a line on the roadway. In the extrusion system, the thermoplastic melt is pumped at a lower pressure and gathers in a collection box disposed by the road surface. The box opens when material is desired and small, flat stream of material is placed on the ground as the vehicle moves forward. The ribbon gun method is similar to extrusion system with the exception of the box used to gather material by the road surface. A ribbon gun places material directly on the roadway after passing through a flat opening as wide as the desired line.

Roadway marking tapes are typically applied using a specialized tape applicator. Such applicators typically utilize a roller which rests against the pavement surface and applies pressure to the top side (i.e., non-adhesive) of pre-made marking tape to press an adhesive side of the marking tape against the ground.

In thermoplastic, marking tape applications and paint applications that include reflective beads, the resulting roadway marking has a thickness that is typically much greater than the thickness of a regular painted line. That is, these durable markings may extend above the surface of the roadway and are susceptible to unintentional removal. This is especially evident in colder climates where snowplows scrape snow and ice from the roadway surface. To address this concern, a number of states and municipalities have started requiring that a shallow grove be formed in the roadway surface and the marking material be applied in the bottom of the groove. Ideally, this results in a durable marking material that may be below or nearly flush with the roadway surface and thereby resistant to unintended removal.

SUMMARY

Aspects of the present disclosure are based on the realization that difficulties arise both in forming a recessed groove in a roadway surface with a consistent depth as well as applying roadway marking materials (e.g., paint, thermoplastic paint and/or marking tape) within the confines of such a recessed groove formed into the roadway surface. As will be appreciated, the orientation of a machine that cuts a groove(s) into a roadway surface may vary as a vehicle supporting the groove cutting machine passes over the roadway surface. Such variance can result from, inter alia, variation in the crown of the roadway surface. Such variation can result in a variation in a depth of the groove across its width (e.g., between edges of the groove). That is, one edge of the groove may be deeper or shallower than the other edge of the groove. Such variance may result in marking material extending above the roadway surface once applied within the groove. Further, subsequent application of marking material within the confines of a previously formed groove has typically required that such roadway marking materials be applied at very low speeds to allow for successfully aligning the marking material with the groove.

Aspects of the presented disclosure are based on the realization that recent advances in non-contact measurement sensors (e.g., two-dimensional and/or three-dimensional) provide a means for real-time monitoring of roadway marking activities such as the application of roadway marking materials and the formation or recessed grooves, etc. That is, such sensors allow for monitoring these activities during application/formation and may output information that allows for making dynamic adjustments of these activities. Such a sensor(s) may provide a series of contour measurements during the application of roadway marking materials and/or during the formation of a recessed groove within a roadway surface. The contour information may be analyzed to identify physical parameters of the roadway surface, a recessed groove in the surface and/or a marking material applied to the roadway surface. As such information may be analyzed during these processes, adjustments may be made during the processes to maintain the processes within predetermined specifications.

In an arrangement, a system and method (i.e., utility) is provided for monitoring and controlling the application of a roadway marking material into a recessed groove in a roadway surface. The utility includes a roadway marking applicator (e.g., marking tape machine, paint gun, etc.) that is mounted to an application vehicle (e.g., truck, push-cart, etc.) that is configured to move over a roadway surface. The applicator attaches to the application vehicle via a carriage that allows the applicator to move relative (e.g., transverse) to a direction of travel of the vehicle. A contour sensor provides profile information (e.g., two and/or three dimensional image, a plurality of distance measurements, etc.) of the roadway surface and a groove recessed therein. The contour sensor typically provides the contour information for the groove prior to the marking material be applied within the groove. That is, the contour sensor is mounted in front of the applicator. In other arrangements, the contour sensor may be mounted behind the applicator. A controller receives the profile information and identifies one or more physical features of the groove. For instance, the controller may identify one or both edges of the groove (e.g., relative to a surface of the roadway). The controller may then align the applicator with the identified feature. Such alignment may entail utilizing an actuator to move the applicator and/or carriage such that the marking material is deposited within the confines of the groove.

In another arrangement, a system and method (i.e., utility) is provided for forming (e.g., cutting, grinding) a recessed groove in a roadway surface. The utility includes a cutting machine that is configured to form a recessed groove into a roadway surface. A contour sensor provides profile information (e.g., two and/or three dimensional image, a plurality of distance measurements, etc.) of the roadway surface and the groove formed by the cutting machine. recessed therein. The contour sensor typically provides the contour information for the groove shortly after the groove is formed. prior to the marking material be applied within the groove. That is, the contour sensor is mounted in front of the applicator. A controller receives the profile information and identifies one or more physical features of the groove. For instance, the controller may identify one or both edges of the groove (e.g., relative to a surface of the roadway), depth across the width of the groove and/or a smoothness of the groove to name a few. Based on the identified feature(s) of the groove, the controller may alter the operation of the cutting machine. For instance, the controller may change the tilt of the machine such that first and second edge depths of the groove are substantially equal (e.g., less than 5 mills). Alternatively, the controller may alter an operating speed of the cutting machine (e.g., blade rotation) based on the smoothness of a bottom surface of the groove. Alternatively, the controller may adjust the speed the cutting machine passes over a roadway surface while the groove is formed.

In another arrangement, a system and method (i.e., utility) is provided for recording a groove formed into a roadway surface and/or of marking material applied within the groove. The utility includes passing a contour sensor over a roadway surface and taking a series of contour measurements of, for example, a recessed groove in the roadway surface and/or marking material applied to the roadway surface or within a recessed groove in the roadway surface. Each contour measurement may be saved to a record indexed to a geographical location where the measurement was taken. A time stamp may also be included for each measurement. In a further arrangement, the contour information may be analyzed and each measurement may be compared to predetermined thresholds to determine if the monitored groove or marking material is compliant with such thresholds. For instance, the depth and/or smoothness of the groove may be analyzed at each measurement location to confirm if the groove is of the proper depth and bottom surface smoothness.

BRIEF DESCRIPTION OF THE DRAWINGS

For a more complete understanding of the present disclosure and further advantages thereof, reference is now made to the following detailed description taken in conjunction with the drawings in which:

FIG. 5C illustrated a roadways surface and groove profile generated by a contour sensor.

Figure 1:
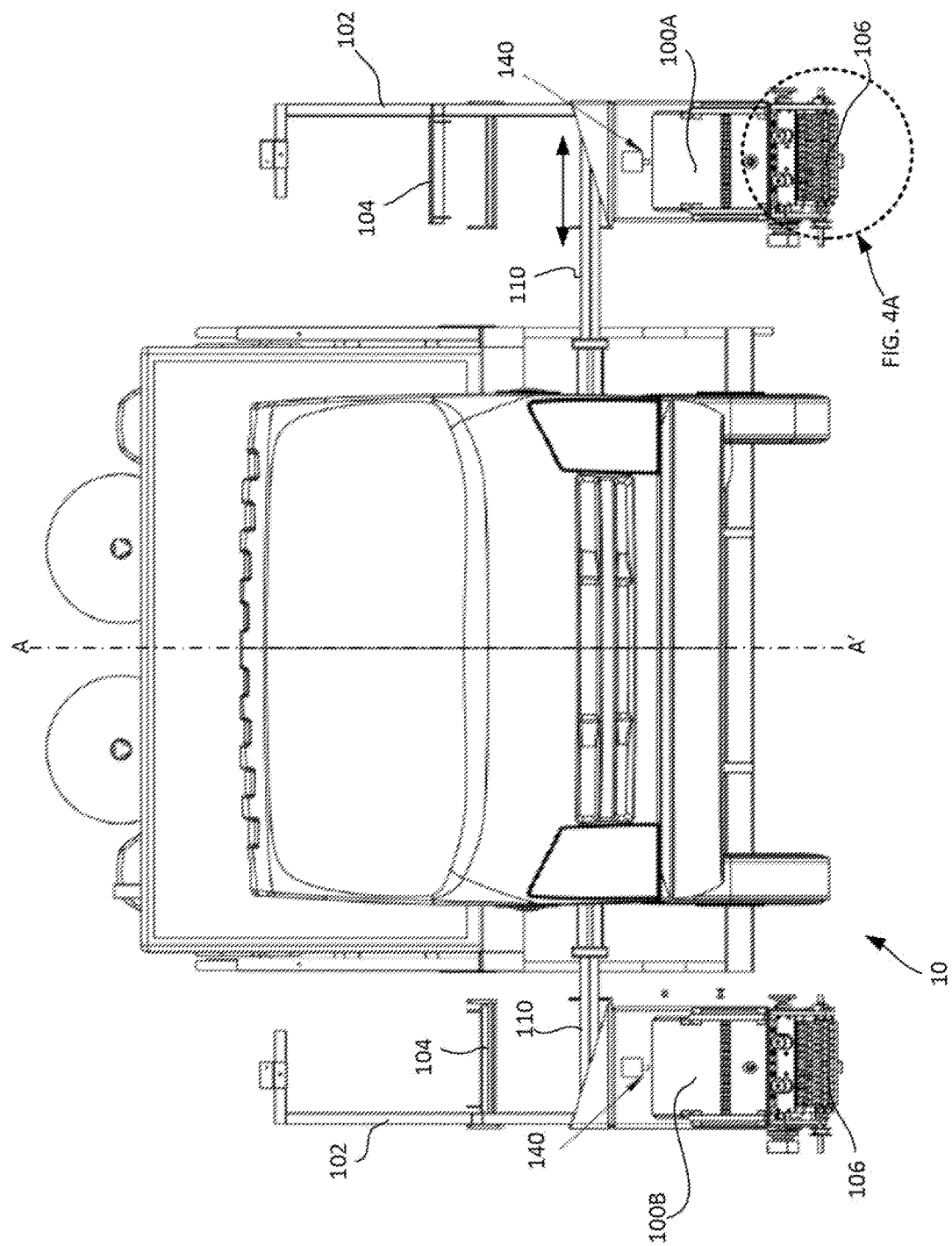
FIG. 1 illustrates a front view of a roadway marking applicator vehicle.

While the invention is susceptible to various modifications and alternative forms, specifics have been shown by way of example in the drawings and will be described in detail below. It should be understood that the intention of the detailed description is not to limit aspects of the invention to the particular embodiments described. Rather, the invention covers all modifications, equivalents, and alternatives falling within the spirit and scope of the invention.

DETAILED DESCRIPTION

Reference will now be made to the accompanying drawings, which at least assist in illustrating the various pertinent features of the presented inventions. The following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

In an embodiment, the present disclosure is directed monitoring and control systems for monitoring and controlling the application of marking material within a preformed groove in a roadway surface. In another embodiment, the present disclosure is directed to monitoring and control systems for monitoring a groove during formation and adjusting one or more parameters of a groove cutting machine to maintain the groove within predetermined limits. In a further embodiment, a monitoring system is provided for monitoring various physical and/or environmental parameters to ensure roadway grooves are formed in accordance with, for example, government or agency regulations.

Figure 2:
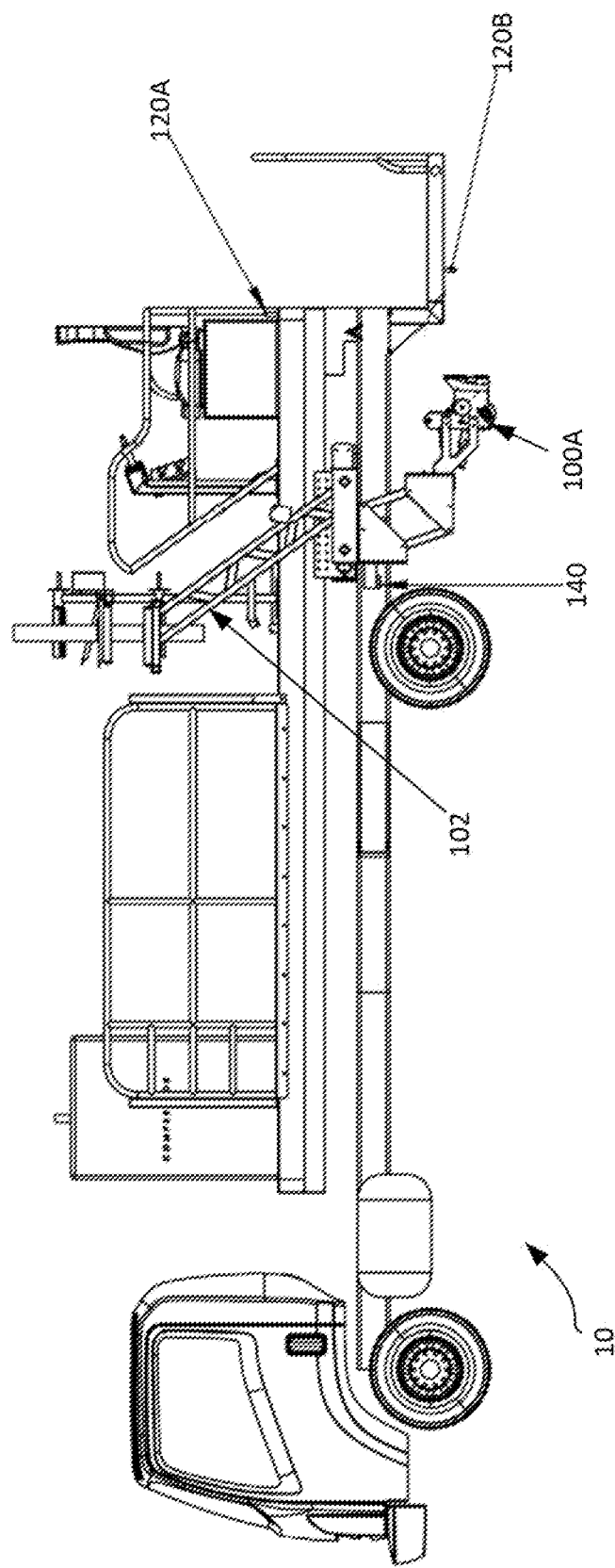
FIG. 2 illustrates a side view of the applicator vehicle of FIG. 1.
Figure 3:
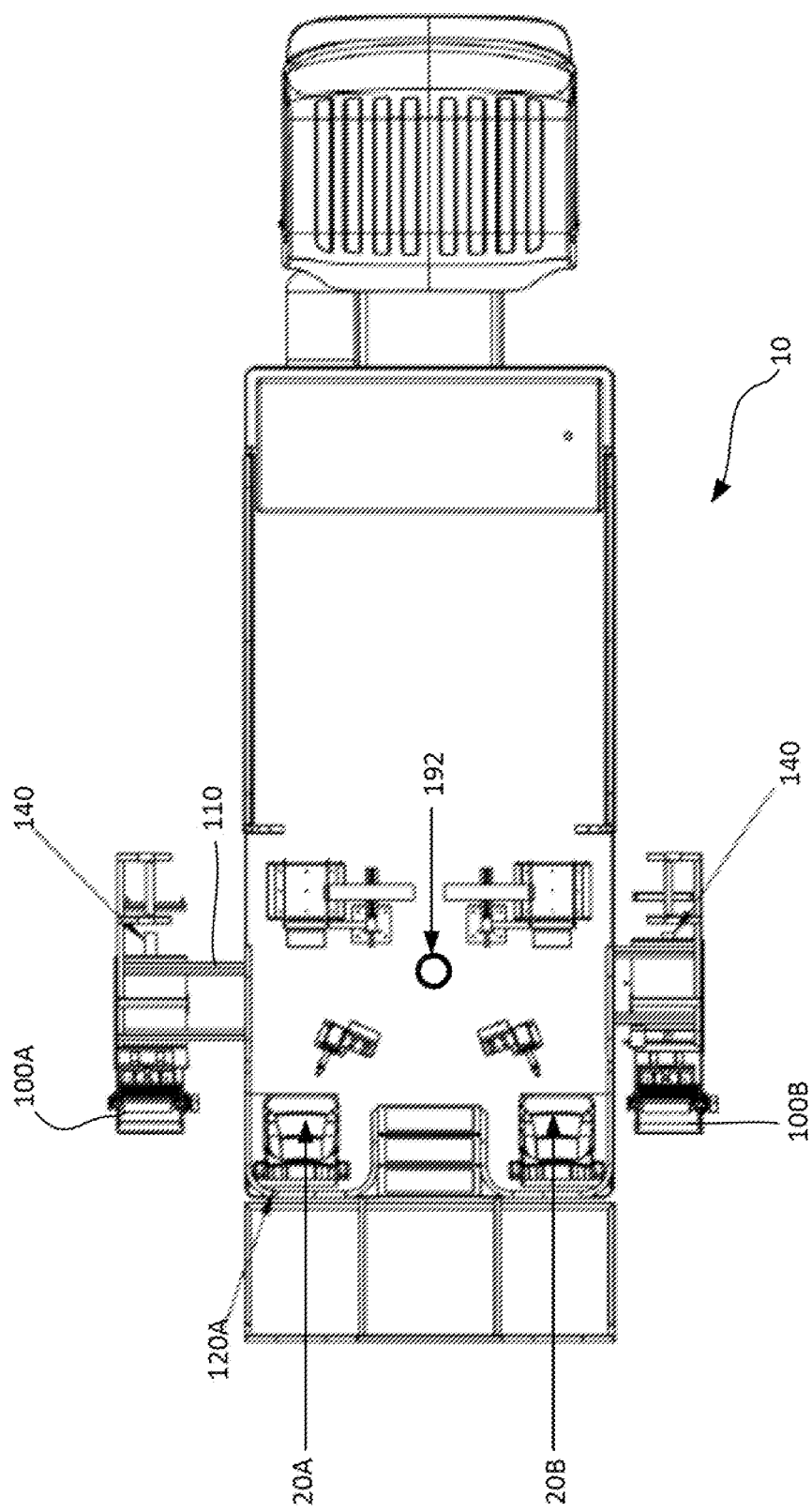
FIG. 3 illustrates a top view of the applicator vehicle of FIG. 1.

FIGS. 1, 2 and 3 illustrate, front, side and top views, respectively, an exemplary embodiment of a roadway marking application truck or vehicle 10. In the illustrated application, the vehicle 10 is adapted to apply roadway marking tape (e.g., reflective marking tape) to a roadway surface while the truck travels over the roadway surface. However, it will be appreciated that in other embodiments, the vehicle may be configured to apply different types of roadway markings including paint (e.g., epoxy paints) and/or thermoplastic paints (e.g., polymers). In the illustrated embodiment, the application vehicle 10 is a flatbed truck that supports first and second tape applicators 100A and 100B (hereafter 100 unless specifically referenced) on opposite sides of the vehicle. The tape applicators 100 are each configured to compress an adhesive side of a marking tape to a roadway surface. In the illustrated embodiment, the application vehicle includes first and second user control stations 20A, 20B mounted on the bed of the truck. Operators utilize each station to control the application of marking tape to a correct location on the roadway surface. Though shown on flatbed truck, it will be appreciated that the tracking and alignment system disclosed herein have broader application and may be utilized on walk behind units as well as ride-on units (collectively, "application vehicles") that apply any type of roadway marking material. All discussion relating to the application vehicle as a truck is for purposes of discussion and not by way of limitation.

Mounted to at least a first side of the vehicle is a tape applicator 100. In the illustrated embodiment, the tape applicator 100 attaches to a carriage 110 that allows movement of the applicator 100 to and away from a centerline A-A' of the vehicle 10 to allow an applied tape to, for example, follow a straight line (e.g., pavement groove) if the vehicle deviates slightly from a straight path. A frame 102 connected to the tape applicator 100 supports a number of rollers, spindles, etc., which support one or more rolls of roadway marking tape prior to their application to a roadway surface. That is, one or more rolls of roadway marking tape may be installed on various supply spindles 104 and fed through the tape applicator 100. Additionally, the roadway marking tape may be fed from spindles located in the bed of the truck. To feed the roadway marking tape into the tape applicator, roadway marking tape from a supply spindle may pass over various rollers (e.g., tensioning rollers; not shown) which aid in maintaining a suitable level of tension on the roadway marking tape as it is being drawn into the tape applicator 100.

After the marking tape enters the tape applicator 100, a feed mechanism directs the pavement marking tape through the interior of the tape applicator. The feed mechanism may include a number of rollers which engage the pavement marking tape. The various rollers of the feed mechanism may comprise ridges, sprockets, teeth, or the like to reduce to the surface area which contacts the adhesive side of the tape to prevent binding or sticking of the tape on the feed mechanism rollers. In any arrangement, the feed mechanism directs that marking tape to an adhesion roller 106 such that a non-adhesive surface engages a portion of the outer periphery of the adhesion roller. The adhesion roller 106 may then press an exposed adhesive surface of the roadway marking tape to a roadway surface. This adheres the marking tape to the roadway surface.

The tape applicator 100 may also include a cutting mechanism (not shown). The cutting mechanism typically includes one or more blades and actuators. The actuator selectively advances the blade through the marking tape to cut the marking tape at desired lengths. Such an arrangement permits applying the marking tape in desired configuration (e.g., skip lines etc.). One embodiment of a tape applicator that may be utilized with the presented system is set forth in co-owned U.S. Patent Publication No. 2020-0157750, the entire contents of which is incorporated herein by reference.

Figure 4A:
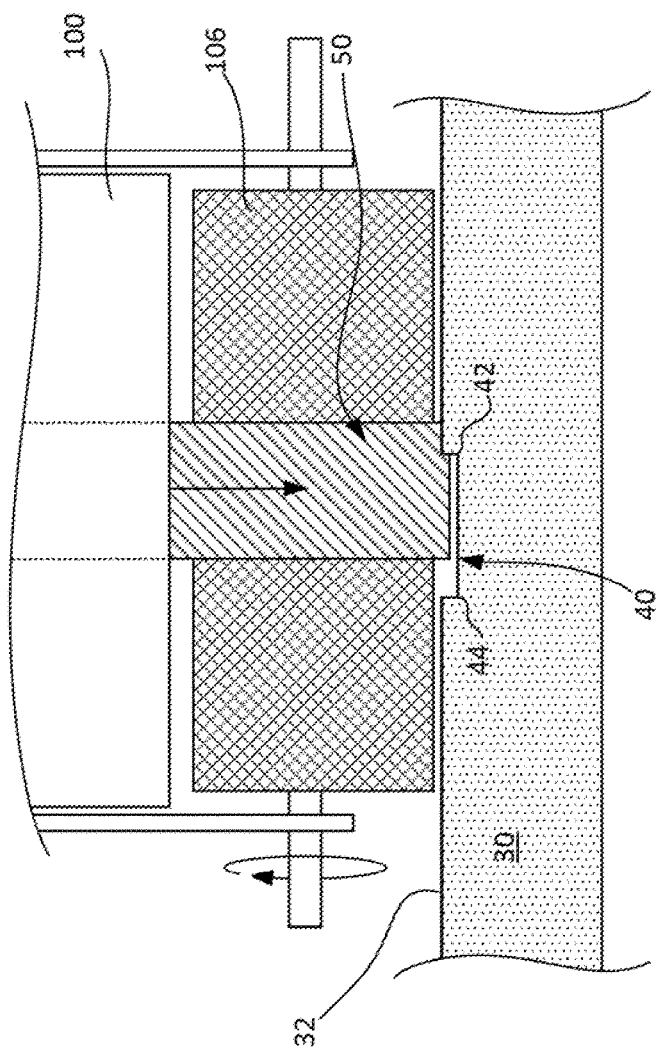
FIG. 4A illustrates a roadway marking tape applicator applying marking tape to a roadway surface.
Figure 4B:
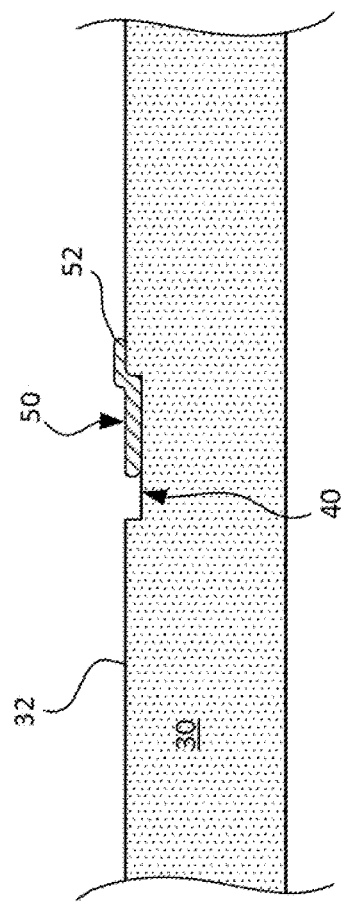
FIG. 4B illustrates a roadway marking tape as applied to a roadway surface.

As noted above, application of roadway marking materials may require that the materials be applied into a groove recessed into a roadway surface. Such application is illustrated in FIG. 4A, which shows a close up of the tape applicator 100 applying a section of marking tape 50 fed through the applicator 100 to a cross-section of roadway 30. As illustrated, the adhesion roller 106 of the applicator 100 is disposed on the top surface (e.g., roadway surface 32) of the roadway to apply the marking tape 50 into a groove 40 recessed within the roadway 30. As illustrated, the groove 40 may have a width between first and second edges 42, 44 that is slightly greater than a width of the marking tape 50. Ideally, the marking tape 50, or other marking material (e.g., thermoplastic ribbon), may be placed entirely within the groove 40 such that, once applied, the marking material 50 is within confines of the groove 40. However, in practice, the roadway marking application vehicle supporting the tape applicator 100 travels over the roadway surface and is subject to slight deviations from the groove. That is, a distance between, for example, a centerline of the application vehicle and a groove formed in the roadway surface may change. If the application vehicle deviates from a path aligned with the groove, the roadway marking material 50 may be applied partially outside of the groove. See FIG. 4B. Additionally, the groove may deviate from a planned line in instances when the application vehicle maintains, for example, straight path. In either instance, prior methods have relied on an operator (e.g., at a user control station) to attempt to maintain alignment of the application vehicle with the groove. Stated otherwise, the operator has attempted to align the marking material with the groove in the pavement. This has typically required the operator to steer the vehicle to maintain alignment. Such methodologies have limited success especially at higher application speeds. As a result, a portion of the marking material may be applied to the roadway surface outside of the groove 40. Accordingly, such material is exposed to, for example, snowplows that may remove the portion outside the groove. Such forces applied to the portion outside the groove may additionally drag the marking material (e.g., marking tape) from within the groove.

To allow for aligning marking material with a groove recessed into a roadway surface, the present application incorporates a sensor that is configured to generate information indicative of a profile or contour of a groove in the roadway surface. Such a profile may be obtained from the roadway surface a short distance in front of a roadway marking applicator (e.g., tape applicator, extrusion collection box, etc.). The profile obtained by the sensor may be utilized to identify one or both edges of a groove formed into the roadway surface. That is, the depth of each edge of the groove may be determined, for example, relative to a reference plane defined by the surface of the roadway on one or both sides of the groove. Additionally, the depth of the groove at any point between the edges may be identified and/or recorded. Likewise, and average depth of the groove may be identified. By identifying one or both edges of the groove, a relative position between the groove and a marking applicator (e.g., tape applicator, ribbon extruder, paint gun, etc.) may be determined. Such a relative position may be output to an actuator that moves the carriage connecting the applicator to the vehicle towards or away from a centerline of the vehicle (e.g., transverse to a direction of travel of the vehicle). Such movement may align the applicator with the groove such that the marking material is more consistently deposited within the groove. Such a system may be automated requiring no user inputs once initiated. Further, such a system allows for increasing application speeds while improving alignment.

Figure 5A:
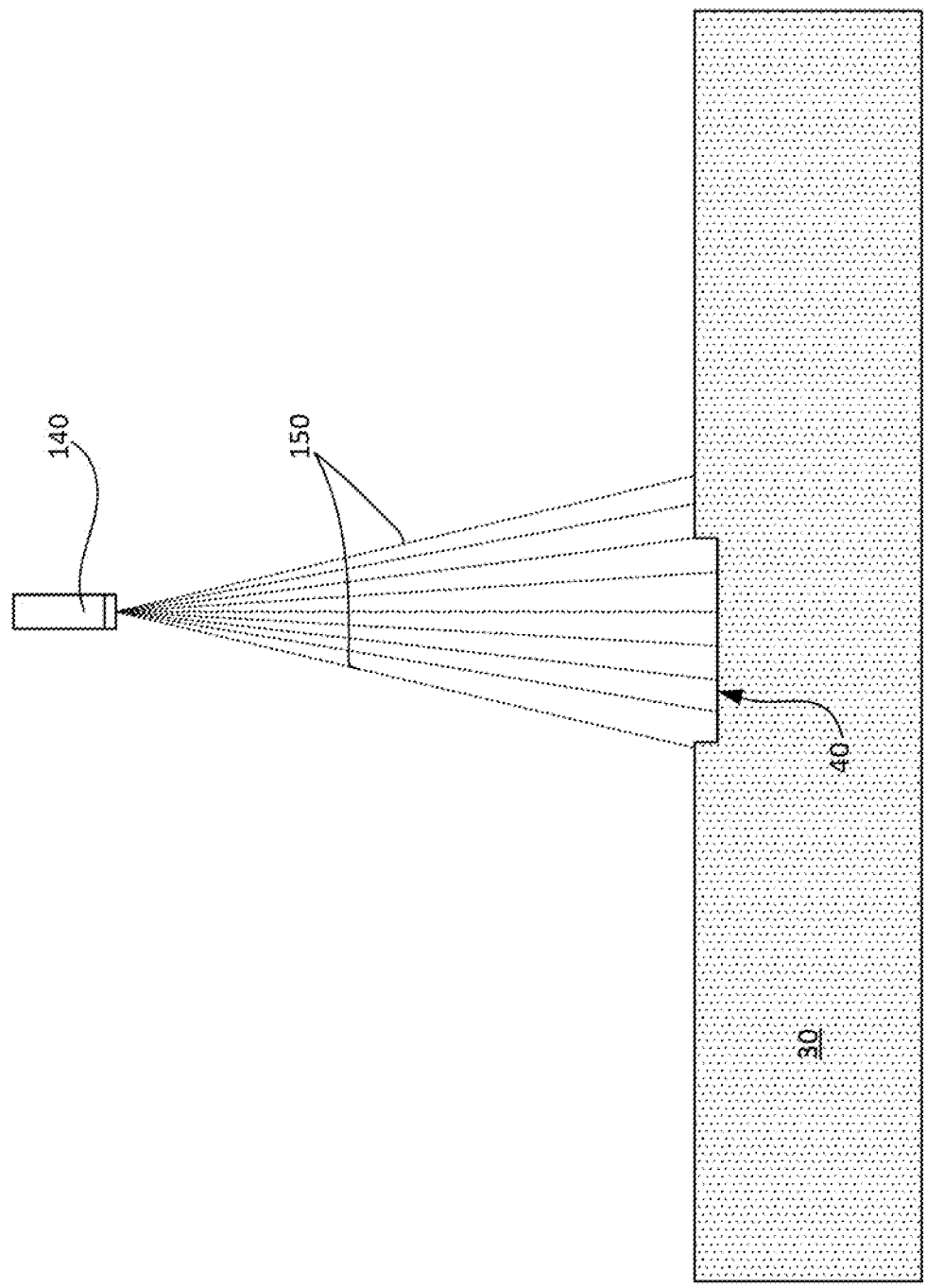
FIGS. 5A and 5B illustrates an embodiment of a contour sensor.
Figure 5B:
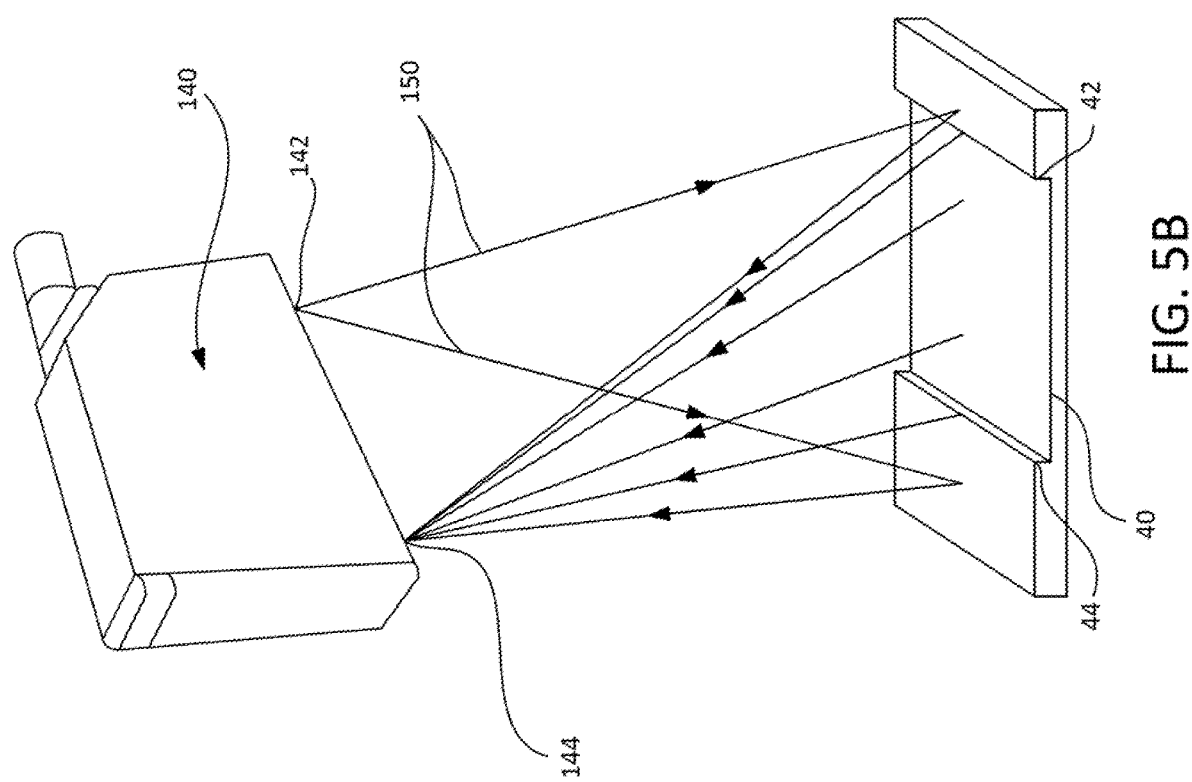

In the presented system, a contour sensor 140 is attached to the vehicle 10 and/or applicator 100 to provide information regarding groove position relative to the vehicle 10 and/or applicator 100. See FIGS. 1-3. The contour sensor 140 is operable to monitor the groove and output information regarding a profile and/or position of the groove. This is illustrated in FIGS. 5A and 5B. As shown the contour sensor 140 is mounted above the roadway 30 and outputs a plurality or fan of measuring beams 150 from an emitter 142. The fan of beams 150 typically includes a plurality of individual measuring beams (e.g., beams 150) that are emitted over a conical/radial arc (e.g., 45°). Preferably, the sensor 140 is mounted at a sufficient distance above the roadway surface 30 such that the fan of measuring beams 150 extend across a width on the groove 40 when the beams contact the roadway surface. It will be further appreciated that multiple contour sensors may be utilized to increase a monitored width on a roadway surface if necessary. At least a portion of each measuring beam reflects back to a receiver 144 of the contour sensor 140. The contour sensor calculates a distance between the sensor 140 and the roadway for each measuring beam. Such calculation is typically based on time of flight principles as known by those skilled in the art of contour and/or distance sensors. The sensor 140 may generate an output for each measurement and may generate a contour 46 of the groove 40. See FIG. 5C. The contour sensor may be any sensor that is operative to generate a contour or profile of a surface. Typically, such sensors are noncontact sensors that are positioned a predetermined distance above the roadway surface. Such sensors include, without limitation, sonar sensors, laser sensors Hall effect sensors and ultrasonic sensors to name a few. In one nonlimiting embodiment, the sensor is an OPD100 Contour Sensor manufactured by imf efector, inc. of 1100 Atwater Dr., Malvern, PA 19355. The sensor 140 may repeatedly generate a contour or profile 46 of the groove. In an embodiment utilizing the OPD100 Contour Sensor, the profile 46 may be generated five times per seconds (e.g., sampling rate of 5 Hz). Other sampling rates are possible. The contour sensor 140 is connected to a control system 300 that receives outputs (e.g., profile data) from the sensor 140. See FIG. 6.

The control system 300 in its simplest form includes a controller 310 connected to the contour sensor 140. The controller 300 is also typically connected to one or more actuators that may control, for example, lateral position(s), cut depth(s), tilt, operating speeds, etc., based on outputs generated by the controller 300 in response to analysis of contour sensor outputs. The control system may additionally receive inputs from additional sensors 120 (environmental sensors, vehicle speed sensors etc.) and/or location sensors 192 (e.g., GPS sensors). The control system may include a user interface 190 and storage 180 (e.g., non-volatile computer memory). In further embodiments, the controller 310 may be connected to external networks 320, however this is not a requirement. One exemplary control system for use with a roadway marking application system and/or groove cutting system is set for in co-owned U.S. application Ser. No. 17/029,374 having a filing date of Sep. 23, 2020, the entire contents of which are incorporated herein by reference. In the present embodiment, the controller is connected to the actuator 130 that is configured to adjust a lateral position of the roadway marking applicator (e.g., relative to a centerline axis of the truck) as further discussed below. That is, the controller 310 is configured to receive outputs from the contour sensor 140 and analyze the data to determine one or more physical features of the groove (e.g., profile parameters). Such physical features or profile parameters may include the location of a first edge 42 and/or second edge 44 of the groove 40. Additionally or alternatively, the profile parameters may include a center of the groove 40 and depth across the width of the groove. In any embodiment, the controller 310 determines a position of the groove relative to the contour sensor 140 and/or the applicator 100.

Referring to FIG. 5C, the width of the groove profile 46 forms a horizontal axis (e.g., X-axis) of the profile while the depth of the groove profile 46 forms a vertical axis (e.g., Y-axis) of the profile. Though illustrated as a two-dimensional profile, it will be appreciated that a three-dimensional profile may be generated. The controller 310 analyzes data from the measurement beams making up the profile data to identify a change in the distance between any two or more samples (e.g., five samples, etc.) and thereby determine a change between measurements to identify a position of an edge surface of the groove 40. Upon identifying a change greater than a predetermined threshold, which may depend on a depth of the groove and/or marking material being utilized, the controller identifies one or both edges of the groove 40 in the profile.

Figure 7A:
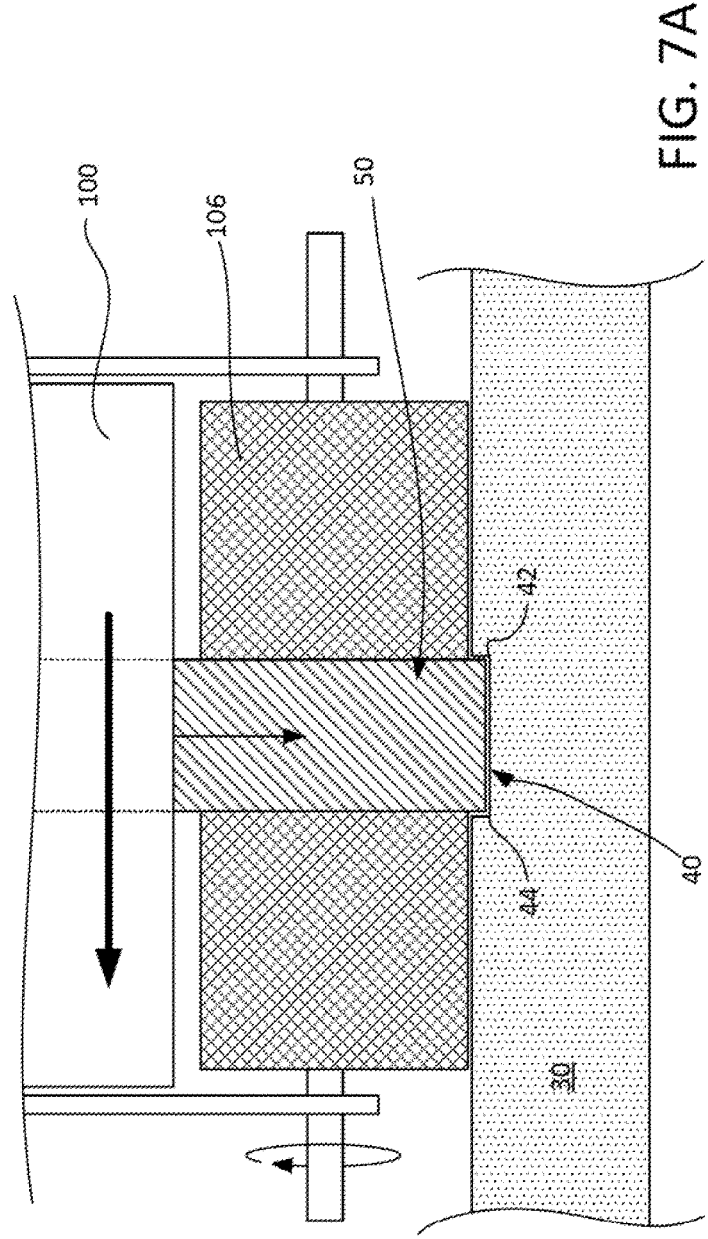
FIG. 7A illustrates a roadway marking tape applicator applying marking tape to a roadway surface.
Figure 7B:
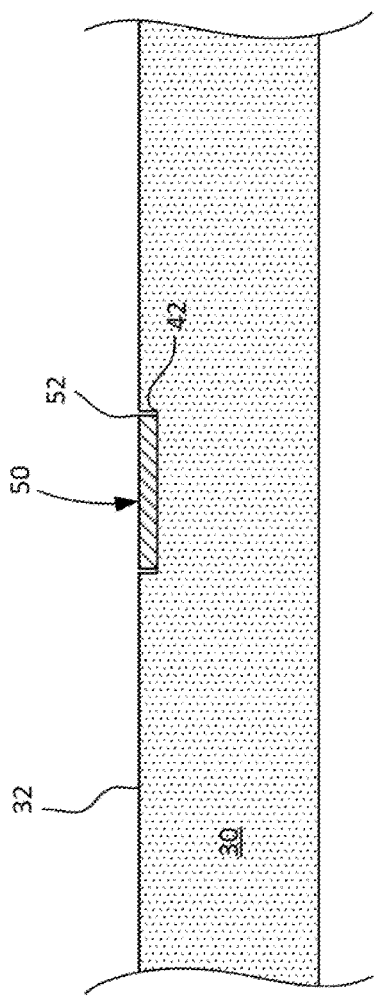
FIG. 7B illustrates a roadway marking tape as applied to a roadway surface.

Additionally, the profile 46 may be generated in a frame of reference with a known reference point or axis. In the embodiment illustrated in FIG. 5C, a reference point/axis may correspond with a known location of an edge 52 of the marking material 50 as applied by an applicator 100. That is, the reference point/axis 52 may identify a known position of the applicator 10 relative to the sensor 140. See also FIGS. 4A and 4B. In the illustrated embodiment, the controller 310 is configured to calculate a distance 'd' between the edge 42 of the groove 40 and the reference axis or edge 52 of the marking material. The controller 310 then generates a control output received by the actuator (not shown), which adjusts a position of the applicator 100 leftward a distance 'd' as shown by the arrow in FIG. 7A, to align the edge 52 of the marking material 50 within the corresponding edge 42 of the groove 40. As a result, the marking material may be disposed within the groove with little or no marking material being disposed outside of the groove. See FIGS. 7A and 7B.

Figure 8:
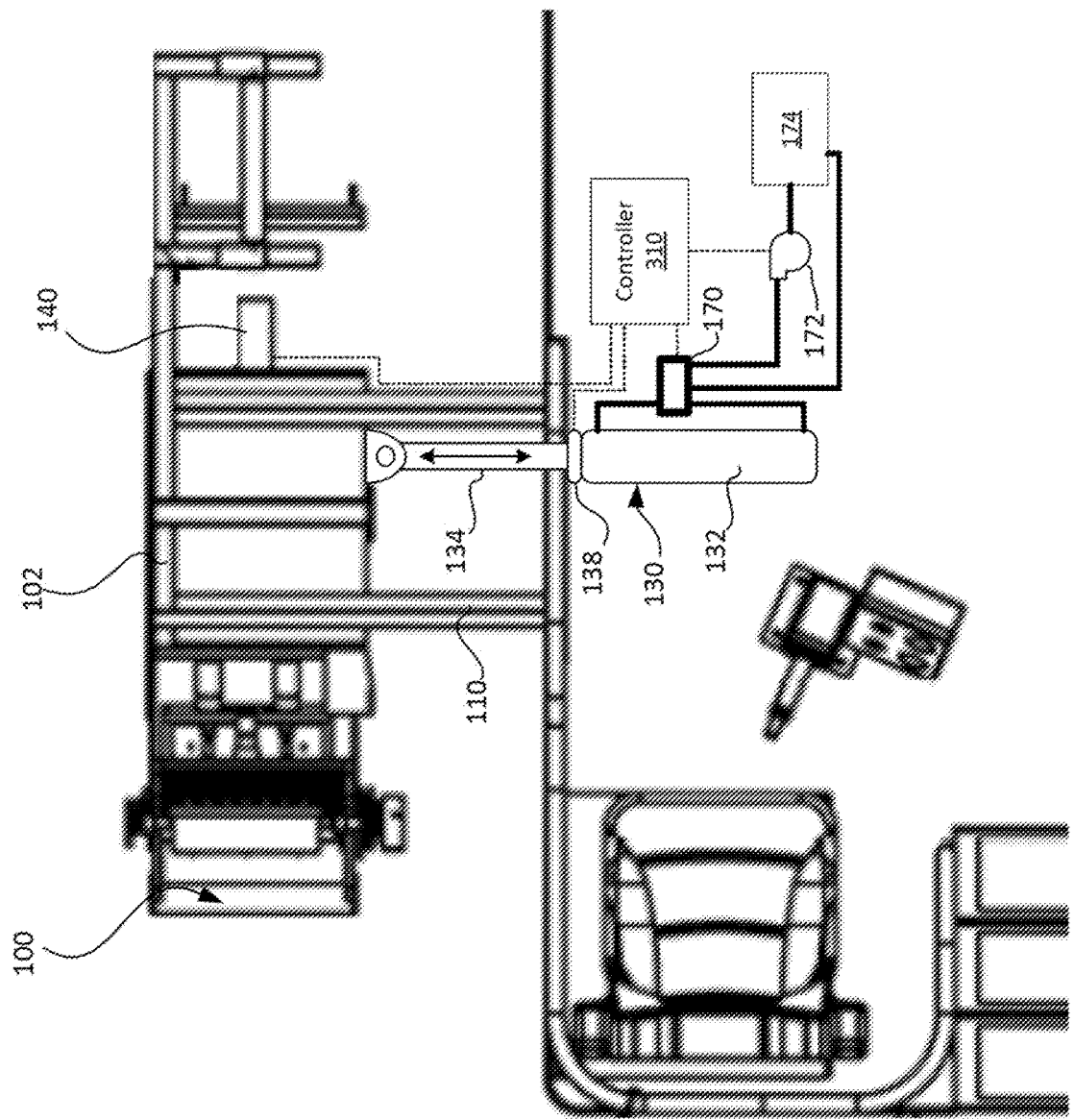
FIG. 8 illustrates an assembly for adjusting the position of a roadway marking applicator.

FIG. 8 illustrates one nonlimiting embodiment of an actuator 130 that is configured to adjust a position of the roadway marking applicator 100 in response to an output from the controller 210. In the illustrated embodiment, the actuator 130 is a hydraulic actuator. However, it will be appreciated that electrical and/or mechanical actuators may be utilized in other embodiments. As illustrated, the actuator 130 is a hydraulic cylinder attached to the applicator vehicle. The hydraulic cylinder 132 includes a shaft 134 that may be extended or retracted relative to the cylinder 132. That is, one end of the shaft 134 is disposed within the cylinder 132 and connects to a piston (not shown). A distal end of the shaft attaches to the frame 102, which supports the roadway marking applicator 100. The frame 102 and applicator 100 connect to the vehicle via the movable carriage 110. Any carriage arrangement may be utilized including, for example, tube in tube, rack and pinion etc. What is important is that the carriage 110 allows the applicator 100 to move relative to the vehicle along at least a first axis in response to movement of the actuator 130 as controlled by the controller 310. As will be appreciated, the configuration of an actuator to adjust the position of a roadway marking applicator may vary based on the type of vehicle utilized (e.g., truck mounted, car mounted and/or walk behind units).

The hydraulic actuator fluidly is connected to a three-way valve 170, a pump 172 and a hydraulic supply/reservoir 174. The three-way valve 170 and the pump 172 may be connected to the controller 210, which controls their operation to control the extension and retraction of the shaft 134 and hence the roadway marking applicator 100.

To allow for moving the shaft 134 and the applicator 100 a determined distance to align the roadway marking material with the groove, the illustrated embodiment includes a linear position sensor 138 connected to the shaft 134. The linear position sensor 138 generates an output received by the controller that allows the controller to determine the position of the shaft and move the shaft a predetermined distance through control of the valve and pump. Any appropriate sensor may be utilized to determine the position of the actuator and/or actuator shaft. One non-limiting example of a linear position sensor for use with a shaft is set forth in U.S. Pat. No. 9,726,168, the entire contents of which is incorporated herein by reference.

Figure 9:
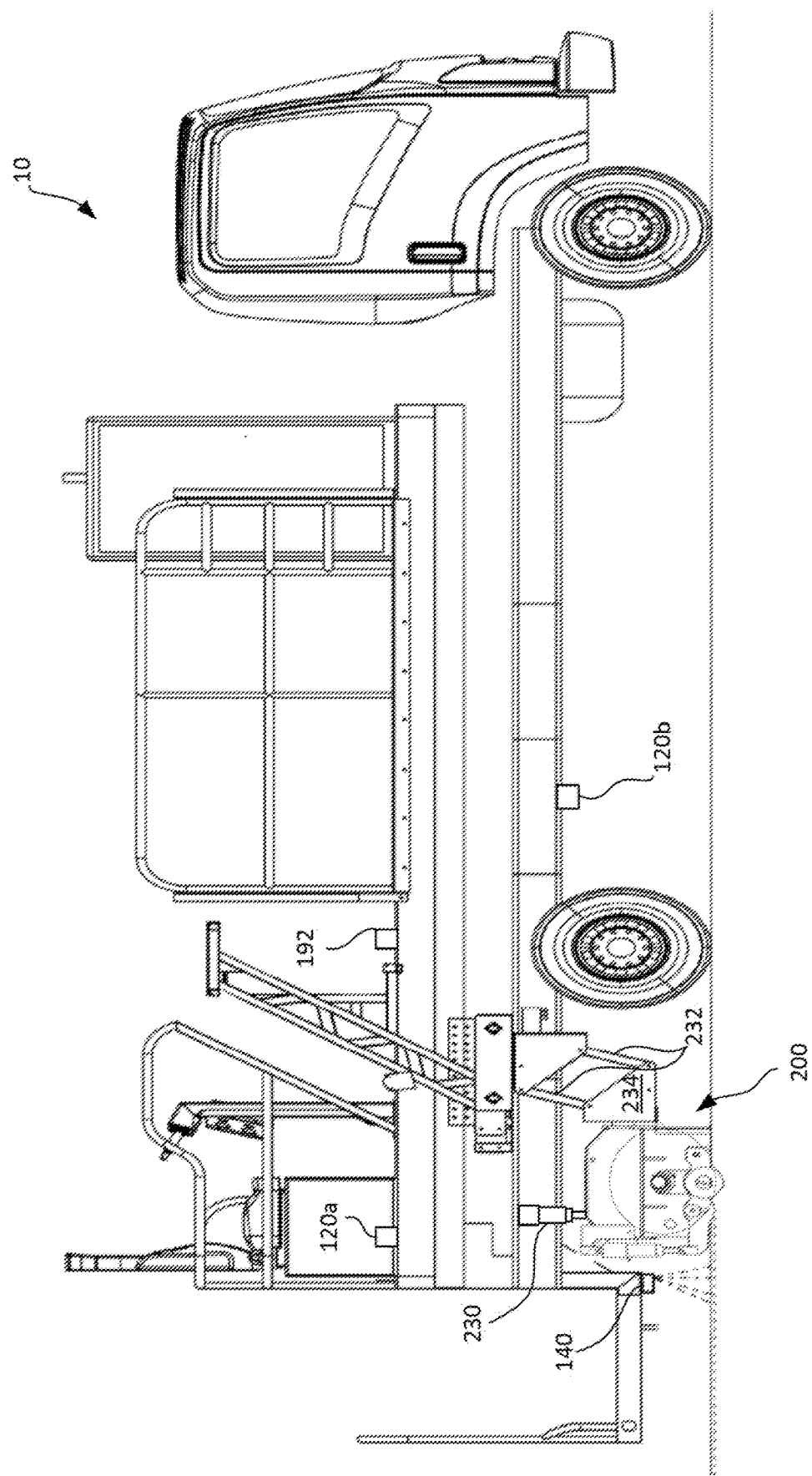
FIG. 9 illustrates a roadway groove cutting vehicle.

In another embodiment, a system is provided for monitoring a groove during formation and, if necessary, adjusting one or more parameters of a groove cutting machine to maintain the groove within predetermined limits. As shown in FIG. 9 a vehicle 10 similar to the vehicle described above supports a groove cutting machine 200 that is configured to cut grooves in roadway surfaces. It will be appreciated that while shown as a truck mounted groove cutting system, such illustration is by way of example and not limitation. The systems described herein may be mounted on variously configured groove forming machines.

As illustrated, the groove cutting machine 200 includes a cutting wheel 210 disposed within a housing 212. The housing 212 includes opposing sidewalls 214a, 214b, a front wall 216, a rear wall 218 and a top wall/plate 219. See also FIGS. 10A-10C. The bottom of the housing 210 is substantially open allowing the cutting wheel 210 within the housing to contact a roadway surface (e.g., asphalt, concrete etc.) In the illustrated embodiment, the cutting machine is attached to the vehicle 10 such that the cutting machine 200 cuts a groove in the roadway surface as the vehicle moves over the roadway. Grooves may be formed (e.g., ground or milled) into the roadway surface to a desired depth, for example, for placement of road lane markings. The depth may be any suitable depth for receiving road surface marking paint or tape. 100-150 mils is a common depth for road pavement applications, although deeper or shallower grooves may be cut using the cutting machine 200.

The cutting wheel 210 typically includes a plurality of individual grinding wheels or blades coaxially mounted on a drive shaft 208. See also FIGS. 10A-10C. In operation, the drive shaft 208 is rotated via a motor (not illustrated), which may be, without limitation, a hydraulic, electric or pneumatic motor depending on torque and speed requirements. Such a motor may be connected to the drive shaft 208 via, one or more gearboxes, pulleys etc. The cutting machine will typically also include various brushes, blowers and/or vacuums for removing debris. Such additional components (e.g., motors, blowers, etc.) are well known and are not illustrated for purposes of simplicity.

As illustrated, the cutting machine 200 is attached to the vehicle 10 via a hydraulic ram 230 and a pivoting linkage 232. The pivoting linkage 232 support a mount housing 234 to which a forward end of the cutting machine housing 212 connects. More specifically, a pivot point mount 220 (e.g., journal or shaft) disposed on the front wall of the housing 212 is received within a corresponding race or bearing (not shown) supported within a rearward surface of the mount housing 234. The hydraulic ram connects to a rearward portion of the housing 212. In operation, the hydraulic ram 230 applies necessary downward force (e.g., weight of the vehicle) to allow the cutting wheel to grind into the roadway surface.

Figure 10A:
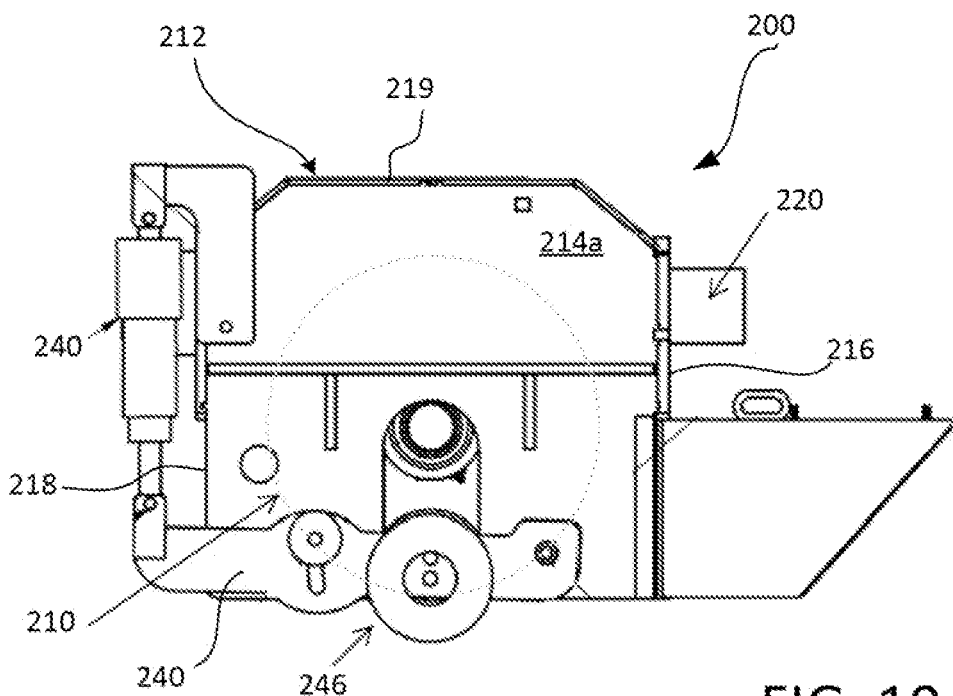
FIGS. 10A-10C various illustrate a groove cutting machine.
Figure 10B:
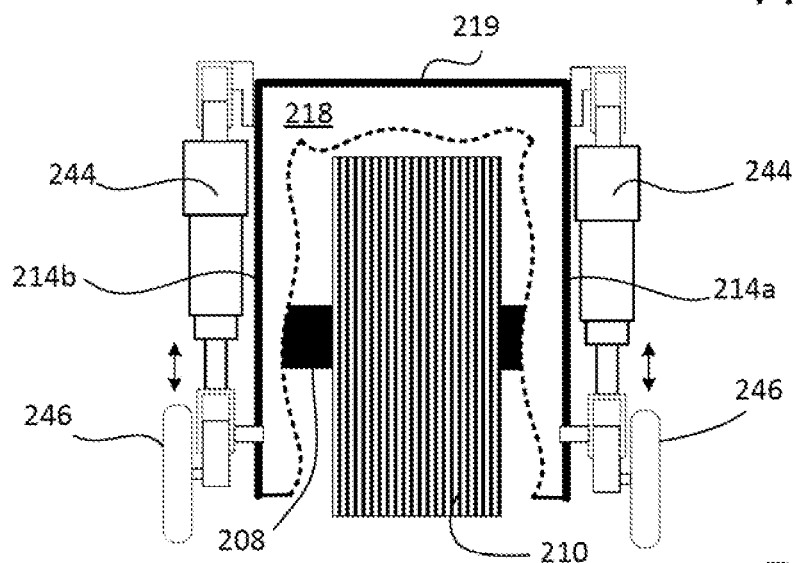
Figure 10C:
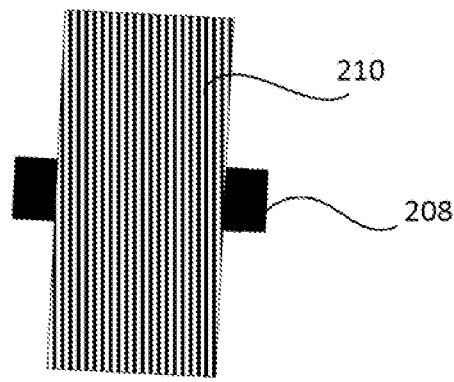

The pivot point mount 220 on the forward end of the cutting machine allows the machine to rotate about an axis that is generally perpendicular to the shaft 208 of the cutting wheel 210 to control a tilt of the machine 200. Specifically, two arm plates 240 attached to the lower opposing edges of the cutting machine housing 212 provide a means for controlling a tilt of the machine about the pivot point mount 220. As best illustrated in FIG. 10A, a forward end of each arm plate 240 (only one shown) is pivotally connected to the housing. A rearward end of the arm plate 240 connects to an actuator 244 (e.g., electric, hydraulic, pneumatic) having an upper end fixedly connected to the housing 212. Supported along a length of the arm plate 240 is a depth wheel 246. The depth wheel 246 is rotatably connected to the arm plate 240 and is configured to roll on the roadway surface while the machine is cutting a groove into the roadway. Extending the actuator 244 rotates the arm plate 240 downward about the pivotal connection to the housing 212. This downward motion drives the depth wheel 246 against the roadway surface lifting one side of the housing. Conversely, retracting the actuator 244 rotates the arm plate 240 upward lifting the depth wheel and allowing the side of the housing to lower toward the roadway surface. The extension and retraction of the two actuators on either side of the housing control the rotation of the housing about the pivot point mount 220. This also adjusts the tilt of the cutting wheel 210 relative to the roadway surface. See, e.g., FIG. 10C. That is, the incorporation of arm plates, 240, actuators 244 and depth wheels 246 on opposing sides of the cutting machine, provides tilt control for the cutting wheel 210. Though illustrated as utilizing depth wheels to control the depth and tilt of the cutting head, it will be appreciated that other control means may be utilized.

While the hydraulic ram 230 and actuators 244 providing means for controlling the depth and tilt, respectively, of the cutting wheel 210, prior systems have provided limited if any ability to control these adjustors in real-time. That is, prior systems have typically relied on operator control based on observation by the operators and/or mechanical depth gauges. To provide enhanced control, which may be automated and in substantially real-time (e.g., within seconds), the groove cutting system incorporates a contour sensor 140 that is attached to the vehicle 10 and/or cutting machine 200 to provide groove contour information after groove is formed into the roadway surface. See FIG. 11A. As shown the contour sensor 140 is mounted above the roadway behind the groove cutting machine and outputs a plurality of measuring beams 150 from an emitter 142. The fan of beams 150 typically includes a plurality of individual measuring beams that are emitted over a conical arc (e.g., 45°). In an embodiment, the contour sensor is a three-dimensional (3D) sensor that provides 3D contour information. In one non-limiting embodiment, the sensor is an In-Sight 3D-L4000 3D Vision System manufactured by Cognex of One Vision Drive, Natick, MA 01760.

Figure 6:
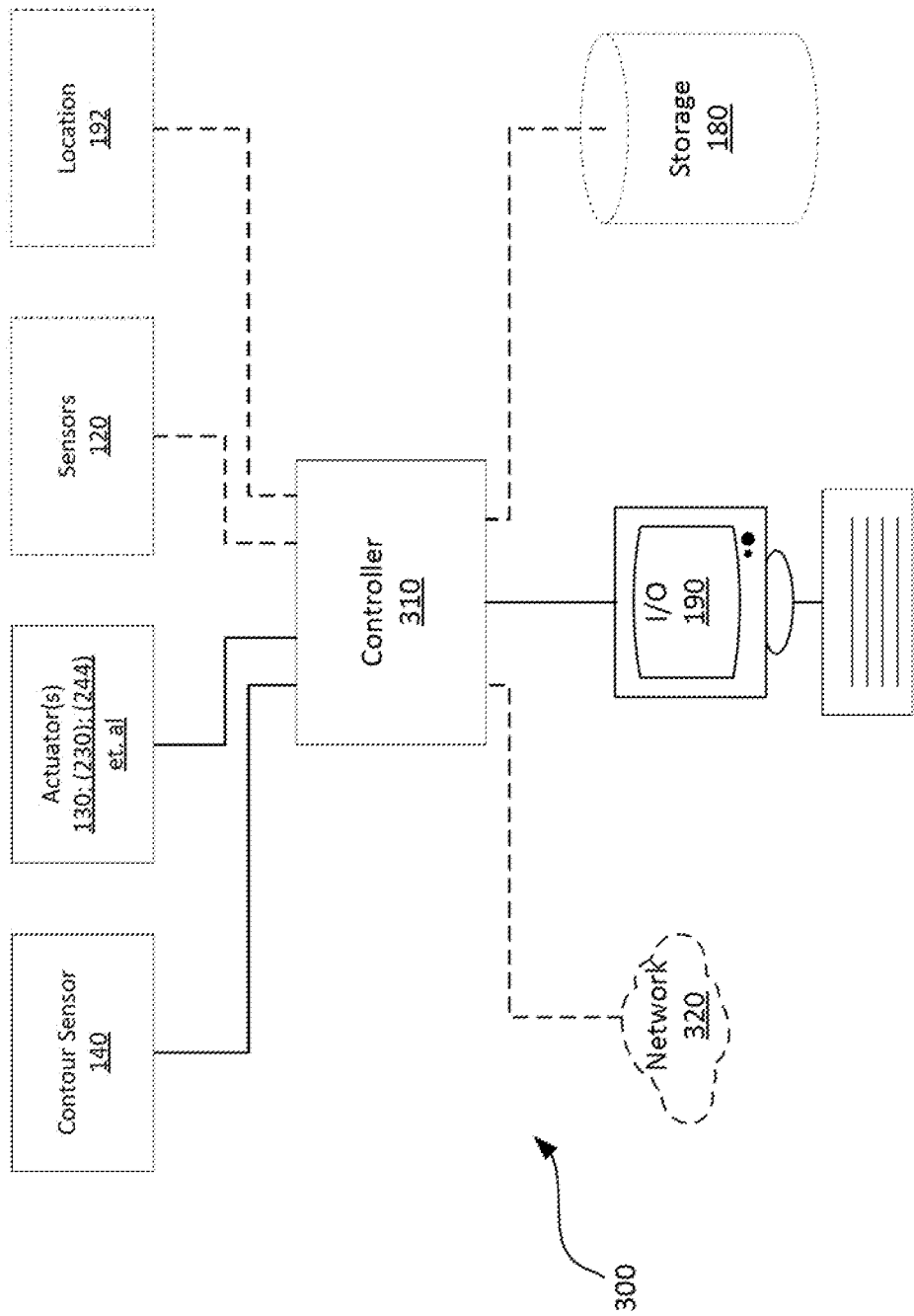
FIG. 6 illustrated a control system for a groove alignment and/or cutting system.
Figure 12A:
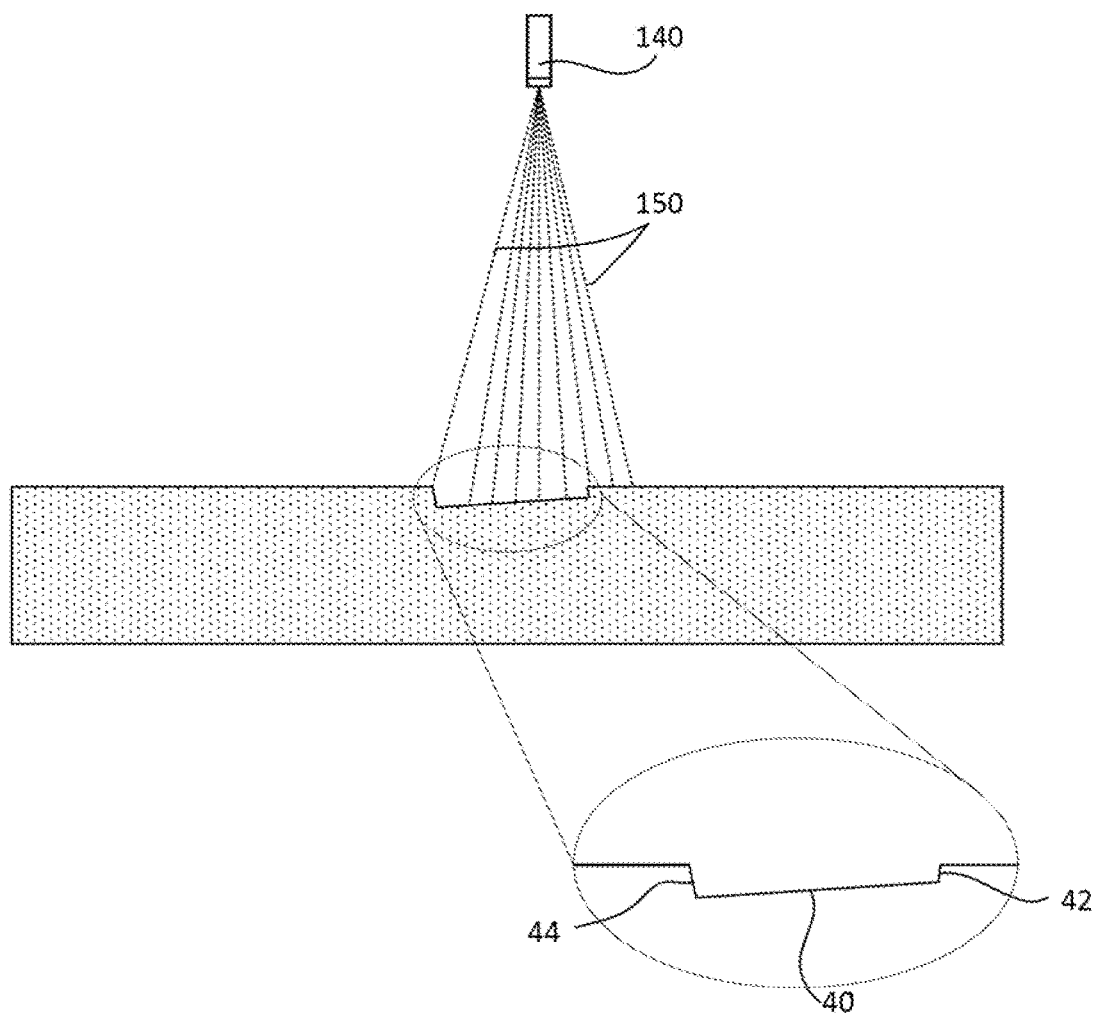
FIGS. 12A and 12B illustrates use of a contour sensor to adjust a tilt of a cutting machine.
Figure 12B:
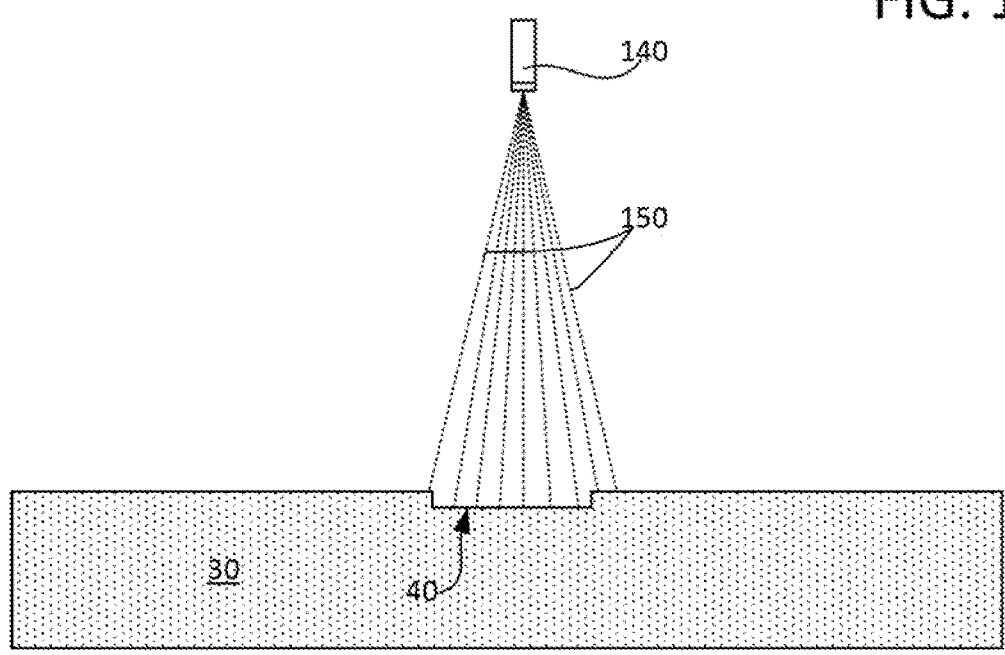

Referring to FIGS. 5C and 6, the contour sensor 140 allows for determining a profile of the groove 40 between a first edge 42 and a second edge 44. Further, the sensor 140 or an attached controller 310 may determine a depth of the groove at any point across the width of the groove 40. Along these lines, if a depth (e.g., average depth) is too deep or too shallow, the controller 310 may generate an output to adjust one or both actuators 244 to lift or lower the cutting machine an amount as determined from measurements from the contour sensor. In a further arrangement, the controller 310 may determine that a depth of a first edge 42 or the groove 40 differs from a depth of the second edge 44 of the groove 40. See, e.g., FIG. 12A. As discussed above, individual control of one or both actuators 244 connected to the depth wheels 246 on either side of the cutting machine 200 allows for adjusting the tilt of the cutting wheel 210. Accordingly, the controller 310 may generate an output to adjust the actuator(s) 244 to tilt the cutting machine relative to the pivot point 220. Such adjustments may be made until the depth of the groove is within a desired range and/or until the edge depths are substantially equal. See FIG. 12B. Adjustment of the actuators 244 may be substantially similar to the adjustment of the actuator 130 as described above utilizing, for example, three way valves connected to pressure sources (e.g., hydraulic, pneumatic) and linear position sensors. However, it will be appreciated that numerous controllable systems (e.g., hydraulic, electric, pneumatic, mechanical etc.) and any appropriate actuator(s) and actuator control system may be implemented.

Figure 11A:
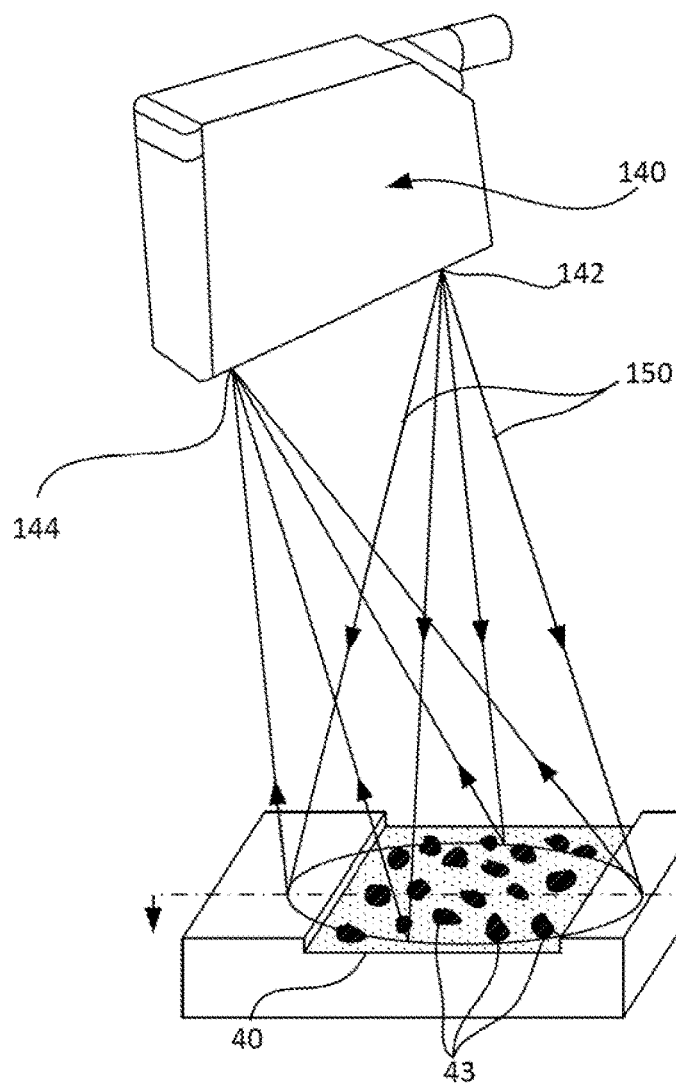
FIGS. 11A-11D illustrates an embodiment of a contour sensor and outputs of the sensor.
Figure 11B:
Figure 11C:
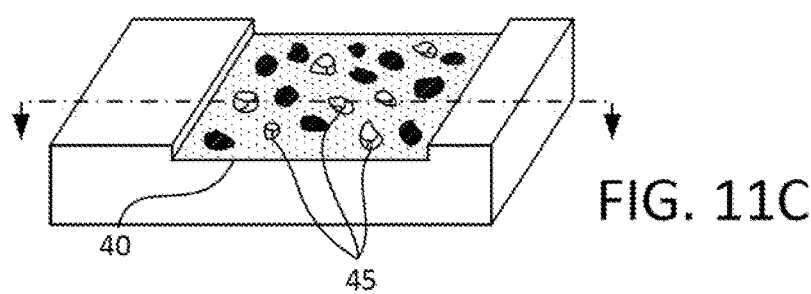
Figure 11D:

The ability to acquire a 3D surface profile (e.g., image) during groove formation allows for additional cutting system control. FIGS. 11A and 11C illustrate two exemplary 3D profile images of grooves formed into a roadway surface. As will be appreciated, most roadway surfaces are a mixture of aggregate (e.g., small stones) and binder (e.g., sand, cement, bitumen). During groove formation, it is preferable if the cutting wheel forms a groove with a generally flat/smooth bottom surface cutting through the aggregate rather than pulling pieces of aggregate out of the surface. This preferable situation is illustrated in FIGS. 11A and 11B. As shown in FIG. 11B, a cross-section taken through the 3D profile/image of FIG. 11A shows that the cutting wheel is cutting a generally flat bottom. That is, the cutting wheel is cutting through individual pieces of aggregate 43 in the roadway surface. In contrast, FIGS. 11C and 11D illustrate a situation where the cutting wheel is pulling individual pieces of aggregate out of the bottom surface of the groove as opposed to cutting through these pieces. That is, the cutting wheel "pocks" the bottom surface of the groove leaving voids 45 in the bottom surface of the groove. As shown in the cross-section of FIG. 11D, the voids 45 left by pieces of aggregate pulled out of the bottom of the groove result in an uneven surface across the bottom of the groove. This may reduce the adherence of, for example, marking tapes applied within the confines of the groove. Likewise, if the cutting machine is moving over the roadway surface too fast, the groove may not be evenly cut across its width. The ability to identify various groove parameters (e.g., smoothness) allows for adjusting the cutting machine to improve groove consistency. By way of example, upon determining the bottom of the groove is not sufficiently smooth from outputs of the contour sensor, the controller may adjust a speed of the cutting wheel. That is, the controller may output a speed control signal to increase a rotation speed of the cutting wheel to provide a better (e.g., smoother) cut. Additionally or alternatively, the controller may output a speed control signal for the vehicle supporting the cutting machine. That is, the speed of the vehicle may be reduced to improve groove parameters. Such outputs from the controller may be output to operators (e.g., display screen) or output to control systems. In the latter regard, various control systems may make adjustments to the controlled system without operator intervention.

In a further embodiment, the control system 300 (See, e.g., FIG. 6) may be utilized as a data logging system for monitoring parameters of the groove(s) (e.g., width, depth, tilt, surface texture/smoothness) to ensure compliance with various roadway marking application parameters. The system and associated method may be operative to generate a record that correlates physical parameters of a groove with location information. Such a record may provide an audit record ensuring the groove(s) is properly formed. Additionally, the system and method may record additional parameters (e.g., environmental parameters) present when the groove is formed. Without limitation, such additional parameters ambient temperature, roadway surface temperature, ambient moisture, roadway surface moisture and/or vehicle speed during groove formation/cutting.

One or more contour sensor readings/outputs (e.g., groove parameters) may be stored to an electronic record that is indexed to location information, which identifies the geographic location where the contour sensor readings were acquired. Further, such a record will typically include a time stamp indicating when the readings were acquired. Most commonly, the electronic record is updated periodically (e.g., every 10 seconds, 30 seconds etc.) or based on distance traveled (e.g., every 30 feet, 100 feet, etc.). By way of example, the record may be updated every 5-10 seconds to provide a highly granular record of groove formation.

Referring again to FIG. 6, the system 300 may also include a database or storage 180 where acquired data may be stored. In various embodiments, the system 300 may also include and input/output device 190 such as a monitor and keyboard, laptop computer, tablet, etc. The I/O device 190 may be located at a control station 20 and/or in a cab of an application vehicle. The I/O device 190 may allow a user to initiate operation of the system. Likewise, the I/O device 190 may provide real-time outputs of monitored parameters to an operator allowing, for example, manual adjustment of one or more parameters.

Referring to FIGS. 1-3 and 8, the illustrated embodiment of the vehicles each include one or more sensors, in addition to the contour sensor, that form part of the data logging system. Primary amongst the additional sensors is a location sensor 192 that determines a location of the vehicle and outputs an indication of that location for incorporation into an electronic record. Any location methodology may be utilized including, without limitation, tracking systems such as the Global System for Mobile Communications (GSM) that utilize cellular network infrastructure to track mobile phones, Global Positioning System (GPS) for GPS sensors and/or combined systems that utilize both cellular network data and GPS to determine location. In the illustrated embodiment, the data logging system includes a GPS receiver that forms the location sensor 192. In some embodiments, the data logging system will also include a speed sensor (not shown) that outputs a current speed of the application vehicle. Such a speed sensor may be incorporated into a wheel of the vehicle or may be a stand-alone sensor that utilizes any appropriate methodology (e.g., radar, laser, etc.) to calculate vehicle speed, which correlates to the application speed of the marking tape and/or the cutting speed of the cutting machine.

In various additional embodiments, the data logging system may incude an ambient temperature sensor 120A, which is preferably mounted above the bed of the vehicle to at least partially isolate the temperature sensor from the roadway.

The system may also include a roadway surface temperature sensor 120B mounted to, for example, an undercarriage of the vehicle. The roadway surface temperature sensor 120B may be configured to obtain a temperature measurement of the roadway surface proximate to the location of the applicator 100 or cutting machine 200. The additional sensors generate outputs of the parameter(s) they measure. Such outputs may be recorded In the illustrated embodiment, the data logging system 200 is optionally connectable to a network 220 via a network interface. Such a network connection enables the system 200 to report acquired data to, for example, a regulatory body. Likewise, such data may be sent to the cloud for storage in a designated database.

In operation, the data logging system 200 is configured to store sensor outputs to a record that may be updated periodically. By way of example, a data record may be generated that stores locations and groove profiles (e.g., 2D and/or 3D) on a periodic basis or on a distance traveled basis. At each measurement point (e.g., time or distance), the illustrated data logging system acquires a location coordinate (e.g., GPS coordinate) for the application vehicle and a groove profile(s) and stored this information to the record. Such a record may be initiated at the beginning of an application run and may be terminated at the end of such an application run.

Table 1 illustrates one exemplary embodiment of a data record that may be generated during application of roadway marking tape:

TABLE 1

| Time | Location | Avg. Groove Depth | $1^{st}$ edge depth | $2^{nd}$ edge depth | Smoothness (1-10) | Speed MPH |
| --- | --- | --- | --- | --- | --- | --- |
| 20:07:30 | Lat 40.173922 Long-105.010539 | 50 mils | 51 mils | 49 mils | 10 | 2.3 MPH |
| 20:09:00 | Lat 40.173873 Long-105.010539 | 49 mils | 50 mils | 49 mils | 9 | 2.2 MPH |
| 20:10:30 | Lat 40.173856 Long-105.010539 | 50 mils | 51 mils | 49 mils | 10 | 2.3 MPH |
| 20:12:00 | Lat 10.173824 Long-105.010539 | 51 mils | 53 mils | 50 mils | 10 | 2.4 MPH |

In this exemplary record, the data logging system indexes a time when a groove contour measurement was taken, where the groove measurement was taken (i.e., location), average groove depth, edge depth of the first groove edge, second groove edge depth, smoothness rating and vehicle speed. In this specific embodiment, contour sensor measurements are recorded every minute and a half. However, any time period may be utilized and may be adjusted by an operator. For each set of measurements, the data logging system acquires a GPS coordinate of the groove cutting machine, travel speed of the machine as well as measurements from the contour sensor, from which various measurements (e.g., depths) may be calculated. Of note, the record is exemplary and different and/or additional parameters may be recorded. By way of example, surface smoothness information and/or roadway temperature may be incorporated into the record. Further, actual images (e.g., 2D and/or 3D images) from the contour sensor may be saved to the record. In any arrangement, such a record may be initiated at the beginning of an application run and may be terminated at the end of such an application run.

While discussed above as creating a record during the formation of a groove into a roadway surface, a similar record may be generated separate from the formation of the groove into the surface. For instance, a separate inspection unit (e.g., vehicle, cart etc.) carrying a contour sensor may pass over the groove after being formed into the roadway surface. In such an embodiment, a contour sensor record may be made for audit purposes. That is, various parameters may be recorded to, for example, verify compliance with predetermined specifications. Further, it will be appreciated that such a record may be created for the application system that controls application of a marking material within the confines of a preformed groove in a roadway surface as discussed in relation to FIGS. 1-8 above. In such an embodiment, the application system may incorporate a second contour sensor behind the marking applicator to record if the marking material is disposed within the confines of the groove. Alternatively, a separate inspection unit carrying a contour sensor may pass over the marking material as applied within the groove after application to, for example, verify compliance with predetermined specifications.

Figure 13A:
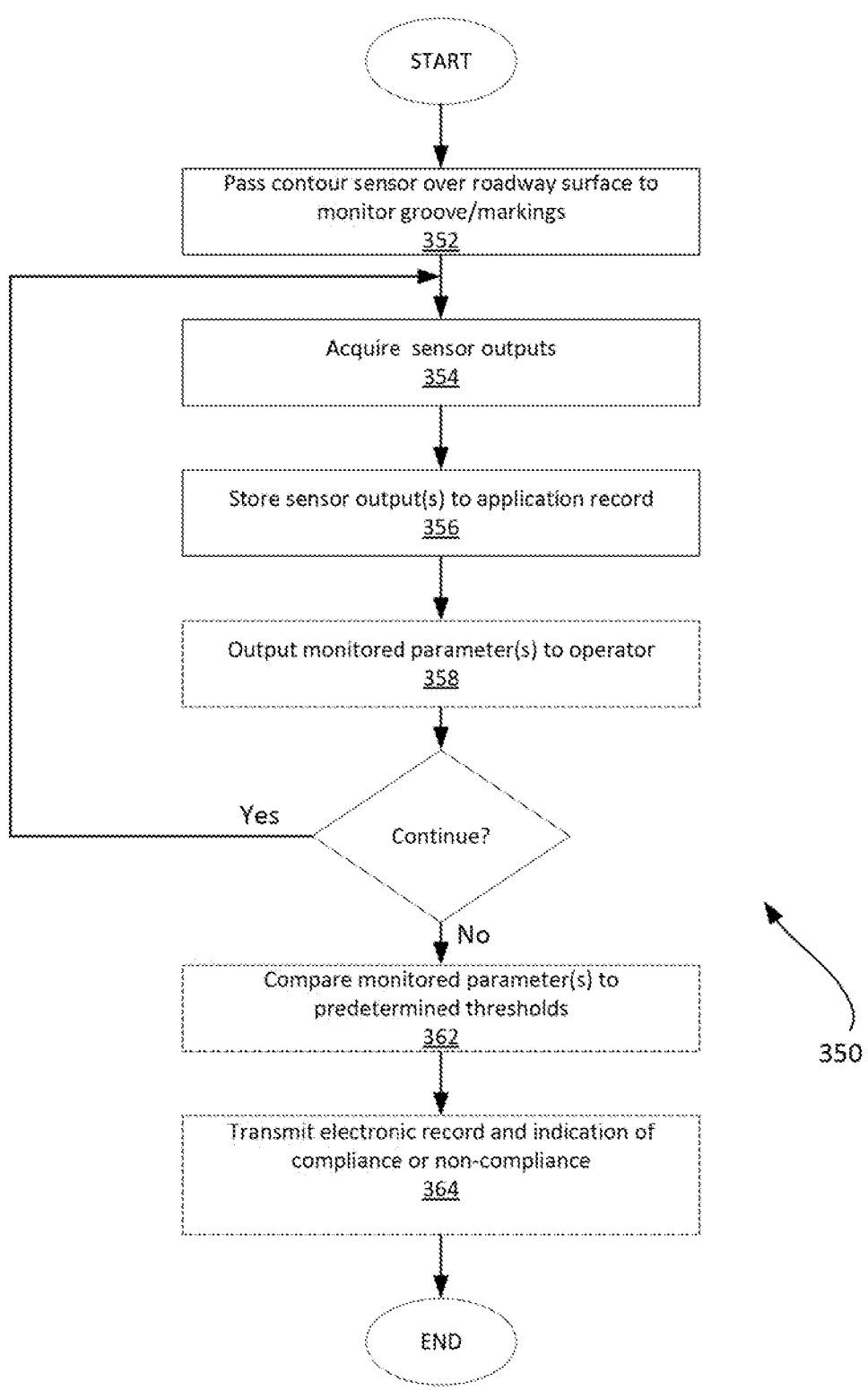
FIGS. 13A-13C illustrate protocols that may be run on a control system.
Figure 13B:
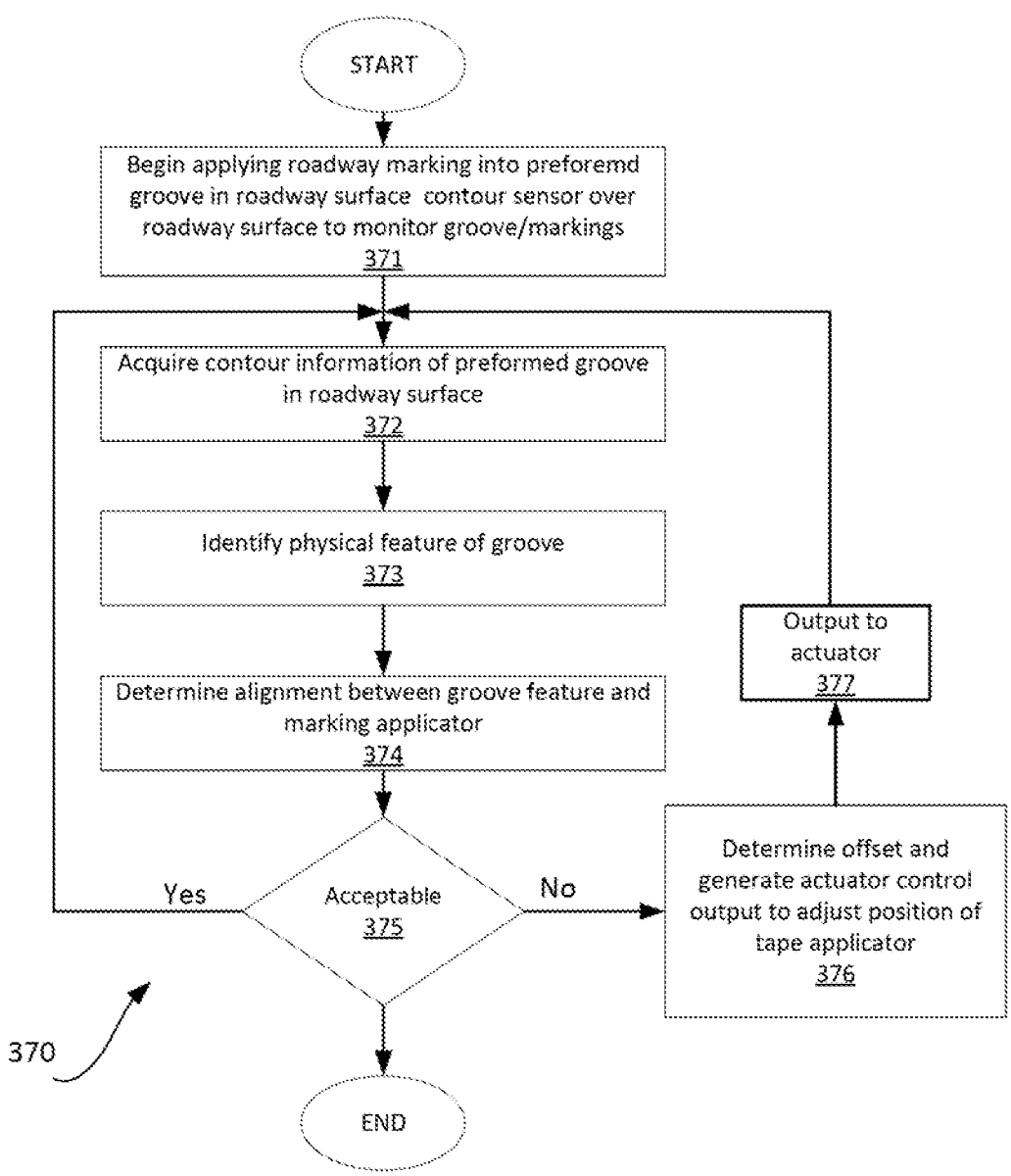
Figure 13C:
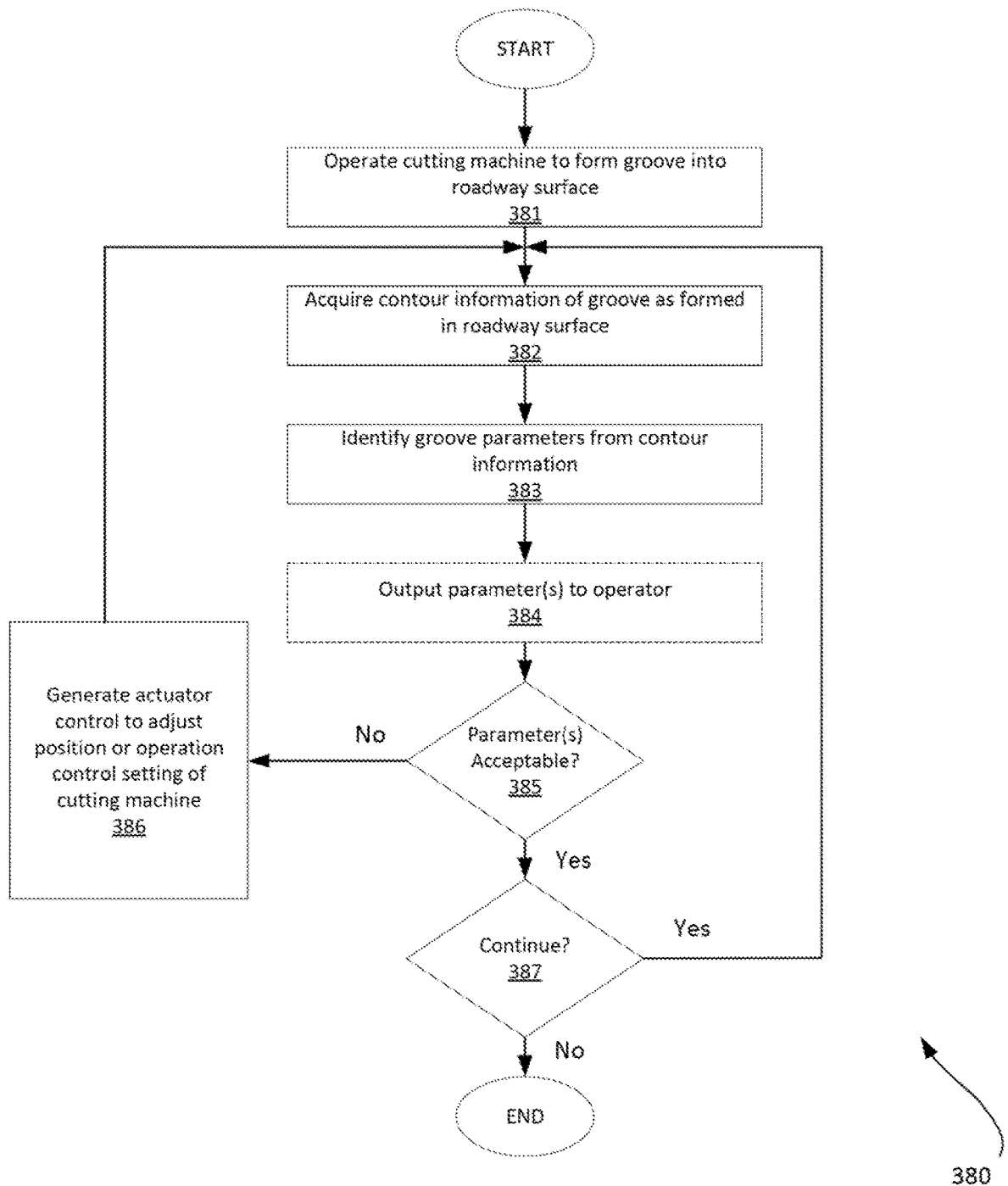

FIGS. 13A-13C illustrate one protocols that may be stored by and implemented by the computation system/controller for system control and/or data logging. FIG. 13A illustrates a protocol for monitoring tape application or groove formation after a groove has been formed in a surface. Initially, the protocol 350 is initiated. One initiated, the contour sensor passes 352 over a roadway surface. The controller acquires sensor outputs 354 from the contour sensor and a location sensor. The sensor output(s) may be stored 356 to an audit record that indexes the various sensor readings and locations. This process may further include calculating information from the contour sensor output. For instance, depth (e.g., average, edges, etc.) and smoothness may be calculated from the contour sensor outputs and stored to the record. Likewise, the existence of marking material outside of the groove (e.g., above the roadway surface may be identified and stored). In an optional step, process may output 358 the monitored parameters to an operator. The process continues to make period or distance based measurements until a roadway section is completed (e.g., as determined by a user). Once data acquisition ceases, an electronic record is generated that corresponds to a section of monitored roadway. The protocol may further entail comparing 362 one or more of the recorded parameters to predetermined parameters to determine if the groove and/or applied roadway marking tape is or is not in compliance with predetermined parameters. Further, the protocol may entail transmitting 364 an indication of compliance or non-compliance. For instance, the electronic record and/or its comparison with predetermined thresholds may be transmitted via the network interface to a regulatory body.

FIG. 13B illustrates a protocol 370 for controlling the application of marking material within a preformed groove in a roadway surface. Initially, roadway marking material is applied 371 into a groove in a roadway surface while an application vehicle passes over the surface. In conjunction with the application, groove contour information is acquired 372 from a sensor (e.g., 2d or 3d contour sensor). Based on the contour information, one or more physical features of the groove are identified 373. Based on the identified physical feature(s) of the groove, an alignment between the groove feature and a roadway marking applicator is determined 374. If the alignment is acceptable 375, steps 372-375 are repeated until a user stops the process. If in any iteration, the alignment is unacceptable 375, an offset between the groove feature and the marking applicator is determined and an actuator control output is generated 376. The output is provided 377 to an actuator, which may adjust a position of the marking applicator to restore alignment. At this time the process 370 may continue.

FIG. 13C illustrates a protocol 380 for controlling a formation of a groove into a roadway surface. Initially, a cutting machine is operated 381 to form a groove in the roadway. In conjunction with operation of the cutting machine, groove contour information is acquired 382 from a sensor (e.g., 2d or 3d contour sensor). Based on the contour information, one or more parameters (e.g., physical features) of the groove are identified 383. These parameters may be output 384 to an operator, which may make manual adjustments to the systems. Alternatively, a controller may determine is the identified parameters (e.g., depth, smoothness, etc.) are acceptable 385. If not, the controller may generate 386 one or more actuator control outputs to adjust an orientation of the cutting machine (e.g., depth, tilt) and/or it operation (cutting wheel RPM, vehicle speed over roadway). Such a process may be repeated until a user terminates the operation.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A method for use with applying roadway marking tape to a roadway surface, comprising:
    passing a contour sensor over a roadway surface having a recessed groove formed therein for receiving a roadway marking material;
    acquiring a series of groove profile measurements from the contour sensor while passing over the roadway surface;
    acquiring a geographical location measurement of a geographic location of the recessed groove in conjunction with each of the series of groove profile measurements;
    generating an electronic record that records the groove profile measurement indexed to the geographic location of the recessed groove, wherein the electronic record includes a plurality of entries for different geographic locations; and
    analyzing each of the series of groove profile measurements to identify at least one physical feature of the recessed groove at each geographical location.

2. The method of claim 1, further comprising:
    comparing the at least one physical feature of the recessed groove to a predetermined threshold at each geographical location.

3. The method of claim 2, further comprising:
    generating an output indicating compliance or non-compliance based on the comparing.

4. The method of claim 1, wherein identifying at least one physical feature comprises identifying at least one of:
    a depth of the groove across a width of the groove;
    at least one edge depth of the groove; and
    a smoothness of a bottom surface of the groove.

5. A system for forming a recessed groove into a roadway surface, comprising:
    a cutting machine configured to form the recessed groove into the roadway surface;
    a contour sensor disposed above the roadway surface, wherein the contour sensor measures a profile of the recessed groove formed into the roadway surface by the cutting machine, wherein the contour sensor outputs depth information across a width of the groove between a first edge and a second edge of the recessed groove;
    a controller operatively connected to the contour sensor, wherein the controller is configured to:
        identify a first depth of the first edge and a second depth of the second edge of the recessed groove from an output of the contour sensor; and
        generate an actuator control output to adjust a tilt of the cutting machine based on a difference between the first depth and the second depth of the groove; and
    at least a first actuator connected to the cutting machine, wherein the at least a first actuator adjusts the tilt of the cutting machine in response to the actuator control output received from the controller.

6. The system of claim 5, wherein the controller is configured to identify:
    multiple depths of the recessed groove across the width of the groove;
    identify a smoothness of the recessed groove based on the multiple depths; and
    generate an output that adjusts one of a speed of the cutting machine and a speed that the cutting machine passes over the roadway surface based on the smoothness of the recessed groove.

7. The system of claim 5, wherein the contour sensor comprises a three-dimensional sensor that generates a three-dimensional profile.

8. A method for forming a recessed groove into a roadway surface, comprising:
    operating a cutting machine to form the recessed groove into the roadway surface;
    acquiring contour information of the roadway surface and the recessed groove from a non-contact sensor;
    based on the contour information, identifying depth information across a width of the groove between a first edge and a second edge of the recessed groove as formed by the cutting machine;
    adjusting a tilt of the cutting machine to substantially equalize a first depth of the first edge of the recessed groove and a second depth of the second edge of the recessed groove.

9. The method of claim 8, further comprising identifying a smoothness of a bottom surface of the recessed groove across the width and adjusting a speed of the cutting machine based on the identified smoothness.

\* \* \* \* \*